US012723656B2

(12) United States Patent
Suzuki et al.

(10) Patent No.: US 12,723,656 B2
(45) Date of Patent: Sep. 1, 2026

(54) SLIDING COMPONENT

(71) Applicant: EAGLE INDUSTRY CO., LTD., Tokyo (JP)

(72) Inventors: Hiroshi Suzuki, Tokyo (JP); Yuichiro Tokunaga, Tokyo (JP); Yuta Negishi, Tokyo (JP); Hiroki Aizawa, Tokyo (JP); Akihiro Takahashi, Tokyo (JP); Nobuo Nakahara, Tokyo (JP); Tetsuzo Okada, Tokyo (JP)

(73) Assignee: EAGLE INDUSTRY CO., LTD., Tokyo (JP)

( * ) Notice: Subject to any disclaimer, the term of this patent is extended or adjusted under 35 U.S.C. 154(b) by 77 days.

(21) Appl. No.: 18/855,281

(22) PCT Filed: Apr. 4, 2023

(86) PCT No.: PCT/JP2023/013918
§ 371 (c)(1),
(2) Date: Oct. 8, 2024

(87) PCT Pub. No.: WO2023/199791
PCT Pub. Date: Oct. 19, 2023

(65) Prior Publication Data

US 2025/0243903 A1 Jul. 31, 2025

(30) Foreign Application Priority Data

Apr. 11, 2022 (JP) ................................ 2022-064988

(51) Int. Cl.
*F16C 17/04* (2006.01)
*F16C 33/10* (2006.01)
(Continued)

(52) U.S. Cl.
CPC ............ *F16J 15/34* (2013.01); *F16C 17/045* (2013.01); *F16C 33/1015* (2013.01);
(Continued)

(58) Field of Classification Search
CPC ................ F16C 17/045; F16C 33/1015; F16C 33/1065; F16C 33/107; F16C 33/741
See application file for complete search history.

(56) References Cited

U.S. PATENT DOCUMENTS 3,085,808 A 4/1963 Williams ...................... 277/388
3,232,680 A 2/1966 Clark ............................ 384/110
(Continued)

FOREIGN PATENT DOCUMENTS

CN 2534429 2/2003 ............... F16J 15/40
CN 1492152 4/2004 ............. F04D 29/12
(Continued)

*Primary Examiner* — Phillip A Johnson
(74) *Attorney, Agent, or Firm* — HAYES SOLOWAY P.C.

(57) ABSTRACT

An annular sliding component is one of two sliding rings that rotate relative to each other and partition a sealed fluid space and a leakage space, the sliding component includes a dynamic pressure generating groove that generates a dynamic pressure, and includes an inclined groove which extends from the leakage space toward the sealed fluid space with an inclination in a forward rotation direction and has a first dynamic pressure generating end portion and a reverse groove which extends from a backward rotation direction side of the inclined groove in a backward rotation direction and has a second dynamic pressure generating end portion.

15 Claims, 24 Drawing Sheets

(51) Int. Cl.
*F16C 33/74* (2006.01)
*F16J 15/34* (2006.01)
*F16J 15/40* (2006.01)

(52) U.S. Cl.
CPC .......... *F16C 33/107* (2013.01); *F16C 33/741* (2013.01); *F16J 15/342* (2013.01); *F16J 15/40* (2013.01)

(56) References Cited

U.S. PATENT DOCUMENTS

| | | | | |
|---|---|---|---|---|
| 3,376,083 | A | 4/1968 | Everhardus | F16C 33/102 |
| 3,410,565 | A | 11/1968 | Williams | 277/348 |
| 3,466,052 | A | 9/1969 | Ludwig | |
| 3,499,653 | A | 3/1970 | Gardner | 277/27 |
| 3,527,465 | A | 9/1970 | Guinard | 277/400 |
| 3,656,227 | A | 4/1972 | Weinand | 29/530 |
| 3,804,424 | A | 4/1974 | Gardner | 277/27 |
| 4,406,466 | A | 9/1983 | Geary, Jr. | 277/347 |
| 4,486,026 | A | 12/1984 | Furumura et al. | 277/80 |
| 5,092,612 | A | 3/1992 | Victor | 277/400 |
| 5,201,531 | A | 4/1993 | Lai | F16J 15/3412 |
| 5,222,743 | A | 6/1993 | Goldswain | 277/400 |
| 5,375,855 | A | 12/1994 | Goldswain et al. | |
| 5,398,943 | A | 3/1995 | Shimizu et al. | |
| 5,441,283 | A | 8/1995 | Pecht et al. | 277/96.1 |
| 5,447,316 | A | 9/1995 | Matsui | F16J 15/34 |
| 5,492,341 | A | 2/1996 | Pecht | 277/400 |
| 5,498,007 | A | 3/1996 | Kulkarni | 277/366 |
| 5,501,470 | A | 3/1996 | Fuse | 277/400 |
| 5,556,111 | A | 9/1996 | Sedy | 277/96.1 |
| 5,664,787 | A | 9/1997 | Fuse et al. | F16J 15/34 |
| 5,702,110 | A | 12/1997 | Sedy | |
| 5,895,051 | A | 4/1999 | Bowers | B62D 5/22 |
| 6,152,452 | A | 11/2000 | Wang | |
| 6,189,896 | B1 | 2/2001 | Dickey et al. | F16L 17/06 |
| 6,446,976 | B1 | 9/2002 | Key | 277/367 |
| 6,817,766 | B2 | 11/2004 | Gomyo | F16C 32/06 |
| 7,044,470 | B2 | 5/2006 | Zheng | F16J 15/3448 |
| 7,258,346 | B2 | 8/2007 | Tejima | F16J 15/3412 |
| 7,510,330 | B2 | 3/2009 | Obara | F16C 32/06 |
| 7,568,839 | B2 | 8/2009 | Gotoh et al. | F16C 32/06 |
| 7,758,051 | B2 | 7/2010 | Roberts-Haritonov et al. | F16J 15/34 |
| 8,814,433 | B2 | 8/2014 | Tokunga | F16C 33/741 |
| 9,062,775 | B2 | 6/2015 | Short et al. | F16J 15/34 |
| 9,279,455 | B2 | 3/2016 | Tokunga | F01D 25/168 |
| 9,291,200 | B2 | 3/2016 | Tokunga | F16C 33/74 |
| 9,353,865 | B2 | 5/2016 | Lattin | F16J 15/342 |
| 9,371,912 | B2 | 6/2016 | Hosoe et al. | F16J 15/34 |
| 9,470,267 | B2 | 10/2016 | Tokunga | F16J 15/345 |
| 9,587,745 | B2 | 3/2017 | Itadani et al. | F16J 15/3412 |
| 9,611,938 | B1 | 4/2017 | Itadani et al. | F16J 15/34 |
| 9,677,670 | B2 | 6/2017 | Itadani et al. | F16J 15/34 |
| 9,765,892 | B2 | 9/2017 | Itadani et al. | F16J 15/34 |
| 9,829,109 | B2 | 11/2017 | Itadani et al. | F16J 15/3412 |
| 9,845,886 | B2 | 12/2017 | Itadani | F16C 33/72 |
| 9,850,953 | B2 | 12/2017 | Tokunga | F16J 25/186 |
| 9,951,873 | B2 | 4/2018 | Inoue et al. | F16J 15/34 |
| 9,982,784 | B2 | 5/2018 | Osada et al. | F16J 15/34 |
| 10,072,759 | B2 | 9/2018 | Inoue et al. | F16J 15/34 |
| 10,113,648 | B2 | 10/2018 | Inoue et al. | F16J 15/342 |
| 10,337,620 | B2 | 7/2019 | Tokunaga et al. | F16J 15/342 |
| 10,473,220 | B2 | 11/2019 | Tokunaga et al. | F16J 15/34 |
| 10,487,948 | B2 | 11/2019 | Inoue et al. | F16J 15/342 |
| 10,495,228 | B2 | 12/2019 | Itadani et al. | F16J 15/34 |
| 10,626,995 | B2 | 4/2020 | Itadani | F16J 15/34 |
| 10,704,417 | B2 | 7/2020 | Tokunaga et al. | F01D 25/16 |
| 10,781,924 | B2 | 9/2020 | Inoue et al. | F16J 15/342 |
| 10,883,603 | B2 | 1/2021 | Inoue et al. | F16J 15/342 |
| 10,883,604 | B2 | 1/2021 | Inoue et al. | F16J 15/342 |
| 11,009,072 | B2 | 5/2021 | Kimura et al. | F16J 15/34 |
| 11,009,130 | B2 | 5/2021 | Itadani | F16J 15/34 |
| 11,125,335 | B2 | 9/2021 | Kimura et al. | F16J 15/34 |
| 11,644,100 | B2 | 5/2023 | Kimura et al. | |
| 11,739,844 | B2 | 8/2023 | Katori | F16J 15/34 |
| 11,821,521 | B2 | 11/2023 | Imura | F16J 15/342 |
| 11,852,241 | B2 | 12/2023 | Suzuki | |
| 11,933,303 | B2 | 3/2024 | Suzuki | F16J 15/3412 |
| 12,188,516 | B2 | 1/2025 | Negishi et al. | |
| 12,209,668 | B2 | 1/2025 | Imura et al. | |
| 12,259,043 | B2 | 3/2025 | Ou | |
| 12,404,936 | B2 | 9/2025 | Imura et al. | |
| 12,473,946 | B2 | 11/2025 | Fukuda et al. | |
| 12,498,044 | B2 | 12/2025 | Suzuki | |
| 2002/0093141 | A1 | 7/2002 | Wang | 277/358 |
| 2003/0178781 | A1 | 9/2003 | Tejima | |
| 2004/0080112 | A1 | 4/2004 | Tejima | 277/306 |
| 2005/0141789 | A1 | 6/2005 | Kita et al. | F16C 32/06 |
| 2005/0212217 | A1 | 9/2005 | Tejima | 277/399 |
| 2005/0259898 | A1* | 11/2005 | Nii | F16C 17/04 384/100 |
| 2007/0296156 | A1 | 12/2007 | Yanagisawa et al. | F16J 15/34 |
| 2008/0100001 | A1 | 5/2008 | Flaherty | 277/400 |
| 2008/0272552 | A1 | 11/2008 | Zheng | 277/400 |
| 2010/0066027 | A1 | 3/2010 | Vasagar | 277/350 |
| 2011/0101616 | A1 | 5/2011 | Teshima | 277/358 |
| 2012/0018957 | A1 | 1/2012 | Watanabe | 277/387 |
| 2013/0189294 | A1 | 7/2013 | Koelle et al. | F16J 15/34 |
| 2013/0209011 | A1 | 8/2013 | Tokunaga | F16C 32/0633 |
| 2015/0115537 | A1 | 4/2015 | Tokunaga | F16J 15/34 |
| 2015/0123350 | A1 | 5/2015 | Itadani | 277/400 |
| 2015/0184752 | A1 | 7/2015 | Itadani | F16J 15/3412 |
| 2015/0226334 | A1 | 8/2015 | Itadani | F16J 15/342 |
| 2015/0240950 | A1 | 8/2015 | Takahashi | F16J 15/363 |
| 2015/0260292 | A1 | 9/2015 | Inoue et al. | F16J 15/342 |
| 2015/0377297 | A1 | 12/2015 | Tokunaga et al. | F16C 33/748 |
| 2016/0033045 | A1 | 2/2016 | Itadani et al. | F16J 15/3412 |
| 2016/0097457 | A1 | 4/2016 | Sun et al. | F16J 15/34 |
| 2016/0252182 | A1 | 9/2016 | Itadani et al. | F16J 15/34 |
| 2017/0198814 | A1 | 7/2017 | Colombo et al. | F16J 15/3412 |
| 2017/0234431 | A1 | 8/2017 | Katori et al. | F16J 15/3412 |
| 2017/0350407 | A1 | 12/2017 | Yamamoto | F16C 33/1045 |
| 2018/0073394 | A1 | 3/2018 | Tokunaga et al. | F01D 25/183 |
| 2018/0128377 | A1 | 5/2018 | Tokunaga et al. | F16J 15/342 |
| 2018/0128378 | A1 | 5/2018 | Tokunaga et al. | F16J 15/342 |
| 2019/0178386 | A1 | 6/2019 | Arai | F16J 15/3496 |
| 2019/0301522 | A1 | 10/2019 | Negishi et al. | F16C 17/026 |
| 2019/0316682 | A1 | 10/2019 | Negishi et al. | F16J 15/34 |
| 2019/0376558 | A1 | 12/2019 | Kimura et al. | |
| 2020/0182299 | A1 | 6/2020 | Kimura et al. | F16C 33/10 |
| 2020/0224768 | A1 | 7/2020 | Imura et al. | F16J 15/34 |
| 2021/0048062 | A1 | 2/2021 | Masumi | F16J 15/3412 |
| 2021/0116029 | A1 | 4/2021 | Kimura et al. | |
| 2021/0116030 | A1 | 4/2021 | Kimura et al. | |
| 2021/0355992 | A1 | 11/2021 | Tokunaga | F16C 17/10 |
| 2022/0056956 | A1 | 2/2022 | Imura et al. | |
| 2022/0099188 | A1 | 3/2022 | Imura et al. | |
| 2022/0099189 | A1 | 3/2022 | Suzuki | |
| 2022/0120313 | A1 | 4/2022 | Ou | F16C 17/024 |
| 2022/0120315 | A1 | 4/2022 | Ou | |
| 2022/0128088 | A1 | 4/2022 | Suzuki | |
| 2023/0228292 | A1 | 7/2023 | Negishi | F16C 17/028 |
| 2023/0235780 | A1 | 7/2023 | Negishi et al. | |
| 2024/0209891 | A1 | 6/2024 | Uchida | F16J 15/3412 |
| 2024/0309910 | A1 | 9/2024 | Fukuda et al. | |
| 2024/0353007 | A1 | 10/2024 | Yamaguchi et al. | |
| 2025/0003495 | A1 | 1/2025 | Minori et al. | |
| 2025/0003497 | A1 | 1/2025 | Tadatsugu et al. | |
| 2025/0243903 | A1 | 7/2025 | Suzuki et al. | |

FOREIGN PATENT DOCUMENTS

| | | | |
|---|---|---|---|
| CN | 101749431 | 6/2010 | F16J 15/34 |
| CN | 101776152 | 7/2010 | F16J 15/48 |
| CN | 103267132 | 8/2013 | F16J 15/54 |
| CN | 103732958 | 4/2014 | F16J 15/34 |
| CN | 103791097 | 5/2014 | F16J 15/34 |
| CN | 104019237 | 9/2014 | F16J 15/16 |
| CN | 104165229 | 11/2014 | F16J 15/40 |
| CN | 104919229 | 9/2015 | F16J 15/34 |
| CN | 105683632 | 6/2016 | F16J 15/34 |
| CN | 106439037 | 2/2017 | F16J 15/34 |
| CN | 206017723 | 3/2017 | F16J 15/16 |

(56) References Cited

FOREIGN PATENT DOCUMENTS

| | | | | |
|---|---|---|---|---|
| CN | 107166036 | | 9/2017 | F16J 15/16 |
| CN | 107532724 | | 1/2018 | F16J 15/34 |
| CN | 107735604 | A * | 2/2018 | F16J 15/3412 |
| CN | 108506494 | | 9/2018 | F16J 15/34 |
| DE | 3619489 | | 12/1987 | F16J 15/34 |
| DE | 4407453 | | 9/1995 | F16C 17/08 |
| EP | 0637706 | | 8/1993 | F16J 15/34 |
| EP | 0896163 | | 2/1999 | F16C 33/10 |
| EP | 2520835 | | 11/2012 | F16J 15/34 |
| EP | 2626604 | | 8/2013 | F16J 15/34 |
| EP | 2977655 | | 1/2016 | F16J 15/34 |
| EP | 3091258 | | 11/2016 | F16J 15/34 |
| EP | 3299686 | | 3/2018 | F16J 15/34 |
| EP | 3922872 | | 12/2021 | F16J 15/34 |
| EP | 3926187 | | 12/2021 | F16C 17/04 |
| EP | 3926188 | | 12/2021 | F16C 17/04 |
| EP | 3943765 | | 1/2022 | F16C 17/04 |
| JP | 36-6305 | | 5/1961 | |
| JP | S49-33614 | | 9/1974 | F16J 15/34 |
| JP | S54-77305 | | 6/1979 | B06B 9/10 |
| JP | S55-177549 | | 12/1980 | F16J 15/16 |
| JP | S57-146955 | | 9/1982 | F16J 15/34 |
| JP | 58-109771 | | 6/1983 | F16J 15/34 |
| JP | 58-137667 | | 8/1983 | F16J 15/40 |
| JP | S59-58252 | | 4/1984 | F16J 15/34 |
| JP | S60-107461 | | 7/1985 | B63H 23/36 |
| JP | S6182177 | | 5/1986 | F16J 15/34 |
| JP | S62-37572 | | 2/1987 | F16J 51/34 |
| JP | S63-033027 | | 3/1988 | F16C 33/46 |
| JP | S63-190975 | | 8/1988 | F16J 15/34 |
| JP | H01133572 | | 9/1989 | F16J 15/34 |
| JP | 2-236067 | | 9/1990 | F16J 15/34 |
| JP | 3-14371 | | 2/1991 | F16J 15/34 |
| JP | 3-35372 | | 4/1991 | F16J 15/34 |
| JP | 3-41267 | | 4/1991 | F16J 15/34 |
| JP | 3-41268 | | 4/1991 | F16J 15/34 |
| JP | 3-108972 | | 11/1991 | F16J 15/34 |
| JP | H04-73 | | 1/1992 | F16J 15/34 |
| JP | H04-145267 | | 5/1992 | F16J 15/34 |
| JP | H04-96671 | | 8/1992 | F16J 15/34 |
| JP | H04337164 | A2 | 11/1992 | |
| JP | H05-90048 | | 12/1993 | F16J 15/34 |
| JP | H05-322050 | | 12/1993 | F16J 15/34 |
| JP | 6-66374 | | 3/1994 | F16J 15/34 |
| JP | H07-55016 | | 3/1995 | F16J 15/34 |
| JP | H08-89489 | | 4/1996 | A61B 5/05 |
| JP | H09-503276 | | 3/1997 | F16J 15/34 |
| JP | H09-329247 | | 12/1997 | F16J 15/34 |
| JP | H10-38093 | | 2/1998 | F16J 15/34 |
| JP | H10-281299 | | 10/1998 | F16J 15/34 |
| JP | 2000-179543 | | 6/2000 | F16C 17/10 |
| JP | 2001-295833 | | 10/2001 | F16C 17/04 |
| JP | 2001-317638 | | 11/2001 | F16J 15/34 |
| JP | 2003-161322 | | 6/2003 | F16C 33/10 |
| JP | 2003-343741 | | 12/2003 | F16J 15/34 |
| JP | 2004-003578 | | 1/2004 | F16J 15/34 |
| JP | 2005-180652 | | 7/2005 | F16J 15/34 |
| JP | 2005-188651 | | 7/2005 | F16J 15/34 |
| JP | 2005-58051 | | 12/2005 | F16C 33/74 |
| JP | 2006-9828 | | 1/2006 | F16C 17/02 |
| JP | 2006-022834 | | 1/2006 | F16J 15/34 |
| JP | 2006-77899 | | 3/2006 | F16J 15/34 |
| JP | 2008-144864 | | 6/2008 | F16C 33/10 |
| JP | 2009-250378 | | 10/2009 | F16J 15/34 |
| JP | 2010-133496 | | 6/2010 | F16J 15/34 |
| JP | 2010-216587 | | 9/2010 | F16J 15/34 |
| JP | 2011-185292 | | 9/2011 | F16J 15/34 |
| JP | 2012-2295 | | 1/2012 | F16J 15/34 |
| JP | 5271858 | | 5/2013 | F16J 15/34 |
| JP | 2016-80090 | | 5/2016 | F16J 15/34 |
| JP | 2017-141961 | | 8/2017 | F16J 15/34 |
| JP | 6444492 | | 12/2018 | F16J 15/34 |
| JP | 2019-15401 | | 1/2019 | F16J 15/34 |
| JP | 2019-173953 | | 10/2019 | F16J 15/34 |
| JP | 2020-173020 | | 10/2020 | F16C 33/74 |
| WO | WO9506212 | | 3/1995 | F16J 15/34 |
| WO | WO9506832 | | 3/1995 | F16J 15/34 |
| WO | WO2012046749 | | 4/2012 | F16J 15/34 |
| WO | WO2014024742 | | 2/2014 | F16J 15/34 |
| WO | WO2014050920 | | 4/2014 | F16J 15/34 |
| WO | WO2014103630 | | 7/2014 | F16J 15/34 |
| WO | WO2014112455 | | 7/2014 | F16J 15/34 |
| WO | WO2014148316 | | 9/2014 | F16J 15/34 |
| WO | WO2014174725 | | 10/2014 | F16J 15/34 |
| WO | WO2015199171 | | 12/2015 | F16J 15/34 |
| WO | WO2016009408 | | 1/2016 | F16J 15/34 |
| WO | WO2016035860 | | 3/2016 | F16J 15/34 |
| WO | WO2016167262 | | 10/2016 | F16J 15/34 |
| WO | WO2016186019 | | 11/2016 | F16J 15/34 |
| WO | WO2016203878 | | 12/2016 | F16J 15/34 |
| WO | WO2017002774 | | 1/2017 | F16J 15/34 |
| WO | WO2017061406 | | 4/2017 | F16J 15/34 |
| WO | WO2018034197 | | 2/2018 | F16J 15/34 |
| WO | WO2018088353 | | 5/2018 | F16J 15/34 |
| WO | WO2018105505 | | 6/2018 | F16J 15/34 |
| WO | WO2018139231 | | 8/2018 | F16J 15/34 |
| WO | WO2018139232 | | 8/2018 | F16C 33/10 |
| WO | WO2019044671 | | 3/2019 | F16C 17/04 |
| WO | WO2019069887 | | 4/2019 | F16J 15/34 |
| WO | WO2020162025 | | 12/2019 | F16C 17/04 |
| WO | WO-2020027102 | A1 * | 2/2020 | F16J 15/3416 |
| WO | WO2020032086 | | 2/2020 | F16J 15/34 |
| WO | WO2020085122 | | 4/2020 | F16J 15/34 |

* cited by examiner

SLIDING COMPONENT

TECHNICAL FIELD

The present invention relates to a sliding component, for example, a sliding component which is one of two sliding rings that rotate relative to each other and are used for, for example, a shaft sealing device sealing a rotating shaft of a rotating machine in an automotive seal field, a general industrial machinery seal field, or another seal field or a bearing of a machine in an automotive bearing field, a general industrial machinery bearing field, or another bearing field.

BACKGROUND ART

As a shaft sealing device that prevents the leakage of a sealed fluid, for example, a mechanical seal includes a pair of annular sliding components which rotate relative to each other so that their sliding surfaces slide on each other. In such a mechanical seal, recently, there has been a desire to reduce the amount of energy lost due to sliding for environmental measures and the like.

For example, a mechanical seal shown in Patent Citation 1 is provided with a dynamic pressure generating groove and a fluid introduction groove. The dynamic pressure generating groove includes an inclined groove which communicates with a leakage side inner space and extends radially outward and a reverse inclined groove which is continuously formed on the outer radial side of the inclined groove and extends in a direction opposite to the inclined groove and has a substantially L shape when viewed from the axial direction. Further, the fluid introduction groove includes a fluid guide groove portion which communicates with an outer space and a Rayleigh step which extends in the circumferential direction concentrically with a stationary seal ring from the inner radial side of the fluid guide groove portion toward a forward rotation direction of a rotating seal ring. A sealed fluid exists in the outer space and atmosphere exists in an inner space.

When the rotating seal ring rotates forward at a low speed, the wear of the sliding surfaces can be suppressed since the sealed fluid flowing out from the fluid introduction groove into a space between the sliding surfaces lubricates the sliding surfaces and the sealed fluid is suppressed from leaking into the inner space from a space between the sliding surfaces since the sealed fluid flowing into a space between the sliding surfaces is pushed out toward the outer space due to the positive pressure generated by pressure generating portions provided at corners of the side wall portion of the inclined groove and the side wall portion of the reverse inclined groove. Further, when the rotating seal ring rotates forward at a high speed, the positive pressure generation capacity of the entire inclined groove becomes larger than the positive pressure generation capacity of the entire Rayleigh step and hence gas lubrication is achieved.

On the other hand, when the rotating seal ring rotates backward, lubricity is improved since the sliding surfaces are slightly separated from each other due to the positive pressure generated at the pressure generating portion provided at the outer radial end of the reverse inclined groove and the sealed fluid flows into a space between the sliding surfaces and the sealed fluid is suppressed from leaking from a space between the sliding surfaces into the inner space since the sealed fluid flowing into a space between the sliding surfaces is pushed out toward the outer space.

CITATION LIST

Patent Literature

Patent Citation 1: WO 2021/246371 A (PAGE 13, FIG. 3)

SUMMARY OF INVENTION

Technical Problem

However, in the sliding component of Patent Citation 1, since the reverse inclined groove continuously extends toward the outer radial side of the inclined groove and the sealed fluid sucked into the reverse inclined groove is likely to flow along the side wall portion of the reverse inclined groove during the forward rotation of the rotating seal ring, there is a risk that the sealed fluid sucked into the reverse inclined groove may not be sufficiently discharged from the inclined groove or the reverse inclined groove toward the outer radial side.

The present invention has been made in view of such problems and an object of the present invention is to provide a sliding component that has high sealing performance during forward rotation and low torque during backward rotation.

Solution to Problem

In order to solve the foregoing problem, according to the present invention, there is provided a sliding component which is one of two sliding rings that rotate relative to each other and partition a sealed fluid space and a leakage space, wherein the sliding component includes a dynamic pressure generating groove that generates a dynamic pressure, the dynamic pressure generating groove includes an inclined groove and a reverse groove, the inclined groove extends from the leakage space toward the sealed fluid space with an inclination in a forward rotation direction which is a relative rotation direction of remaining one of the sliding rings, and has a first dynamic pressure generating end portion, and the reverse groove extends from a backward rotation direction side of the inclined groove in a backward rotation direction which is a relative rotation direction of the one of the sliding rings, and has a second dynamic pressure generating end portion. According to the aforesaid feature of the present invention, the sealed fluid sucked at or near the second dynamic pressure generating end portion is moved toward the inclined groove and is likely to be discharged from the first dynamic pressure generating end portion into a space between the sliding surfaces during the relative forward rotation of the sliding components. Further, a positive pressure is generated at or near the second dynamic pressure generating end portion during the relative backward rotation of the sliding component. As a result, the sliding component has high sealing performance during forward rotation and low torque during backward rotation.

It may be preferable that the second dynamic pressure generating end portion extends from a closed end portion of the inclined groove, and the first dynamic pressure generating end portion and the second dynamic pressure generating end portion are aligned in a circumferential line. According to this preferable configuration, the fluid mainly flowing out from the first dynamic pressure generating end portion of the adjacent upstream inclined groove into a space between the sliding surfaces is easily collected at or near the second dynamic pressure generating end portion of its own reverse groove during the relative forward rotation of the sliding component. Further, the fluid mainly flowing out from the second dynamic pressure generating end portion of the adjacent upstream reverse groove into a space between the sliding surfaces is easily collected by the first dynamic pressure generating end portion at or near the own inclined groove during the relative backward rotation of the sliding component. Further, since the second dynamic pressure generating end portion is disposed on the sealed fluid space side of the inclined groove, it is easy to generate a positive pressure by the reverse groove during the relative backward rotation of the sliding component.

It may be preferable that the first dynamic pressure generating end portion is disposed on a side of the sealed fluid space in relation to the second dynamic pressure generating end portion. According to this preferable configuration, the sealed fluid sucked at or near the second dynamic pressure generating end portion is moved in the circumferential direction and the sealed fluid direction and is likely to be discharged from the first dynamic pressure generating end portion into a space between the sliding surfaces during the relative forward rotation of the sliding component.

It may be preferable that the first dynamic pressure generating end portion is disposed on a side of the leakage space in relation to the second dynamic pressure generating end portion. According to this preferable configuration, the sealed fluid sucked at or near the first dynamic pressure generating end portion is moved in the circumferential direction and the sealed fluid direction and is likely to be discharged from the second dynamic pressure generating end portion into a space between the sliding surfaces during the relative backward rotation of the sliding component.

It may be preferable that wall surfaces of the first dynamic pressure generating end portion and the second dynamic pressure generating end portion on a side of the sealed fluid space are continuous to collectively form a smoothly continuous surface. According to this preferable configuration, a fluid between the first dynamic pressure generating end portion and the second dynamic pressure generating end portion can be smoothly moved.

It may be preferable that wall surfaces of the first dynamic pressure generating end portion and the second dynamic pressure generating end portion on a side of the sealed fluid space are continuous to collectively form an arc-shaped surface. According to this preferable configuration, a fluid between the first dynamic pressure generating end portion and the second dynamic pressure generating end portion can be more smoothly moved.

It may be preferable that the first dynamic pressure generating end portion is defined by lines crossing each other at an acute angle when viewed from an axial direction.

According to this preferable configuration, the positive pressure generating effect at the first dynamic pressure generating end portion is high.

It may be preferable that the first dynamic pressure generating end portion is tapered in the forward rotation direction and have a curved tip. According to this preferable configuration, the positive pressure generating effect at the first dynamic pressure generating end portion is high.

It may be preferable that the second dynamic pressure generating end portion is defined by lines crossing each other at an acute angle when viewed from an axial direction.

According to this preferable configuration, the positive pressure generating effect at the second dynamic pressure generating end portion is high.

It may be preferable that the second dynamic pressure generating end portion is tapered in the backward rotation direction and has a curved tip. According to this preferable configuration, the positive pressure generating effect at the second dynamic pressure generating end portion is high.

It may be preferable that a fluid input/output groove which communicates with the sealed fluid space is further provided. According to this preferable configuration, the lubricity between the sliding surfaces at a low speed can be improved.

It may be preferable that the fluid input/output groove includes a dynamic pressure generating portion. According to this preferable configuration, since the dynamic pressure generating portion can cause a dynamic pressure so that the sliding surfaces are slightly separated from each other and the sealed fluid is introduced between the sliding surfaces, the lubricity between the sliding surfaces can be improved.

Furthermore, in the sliding surface of the sliding component according to the present invention, the extending direction of the inclined groove may have both a component in the radial direction and a component in the circumferential direction. Further, the extending direction of the reverse groove may have at least a component in a direction opposite to the circumferential direction of the inclined groove.

Furthermore, the sealed fluid may be a gas or liquid, or may be a mist mixture of a liquid and a gas.

DESCRIPTION OF EMBODIMENTS

Figure 1:
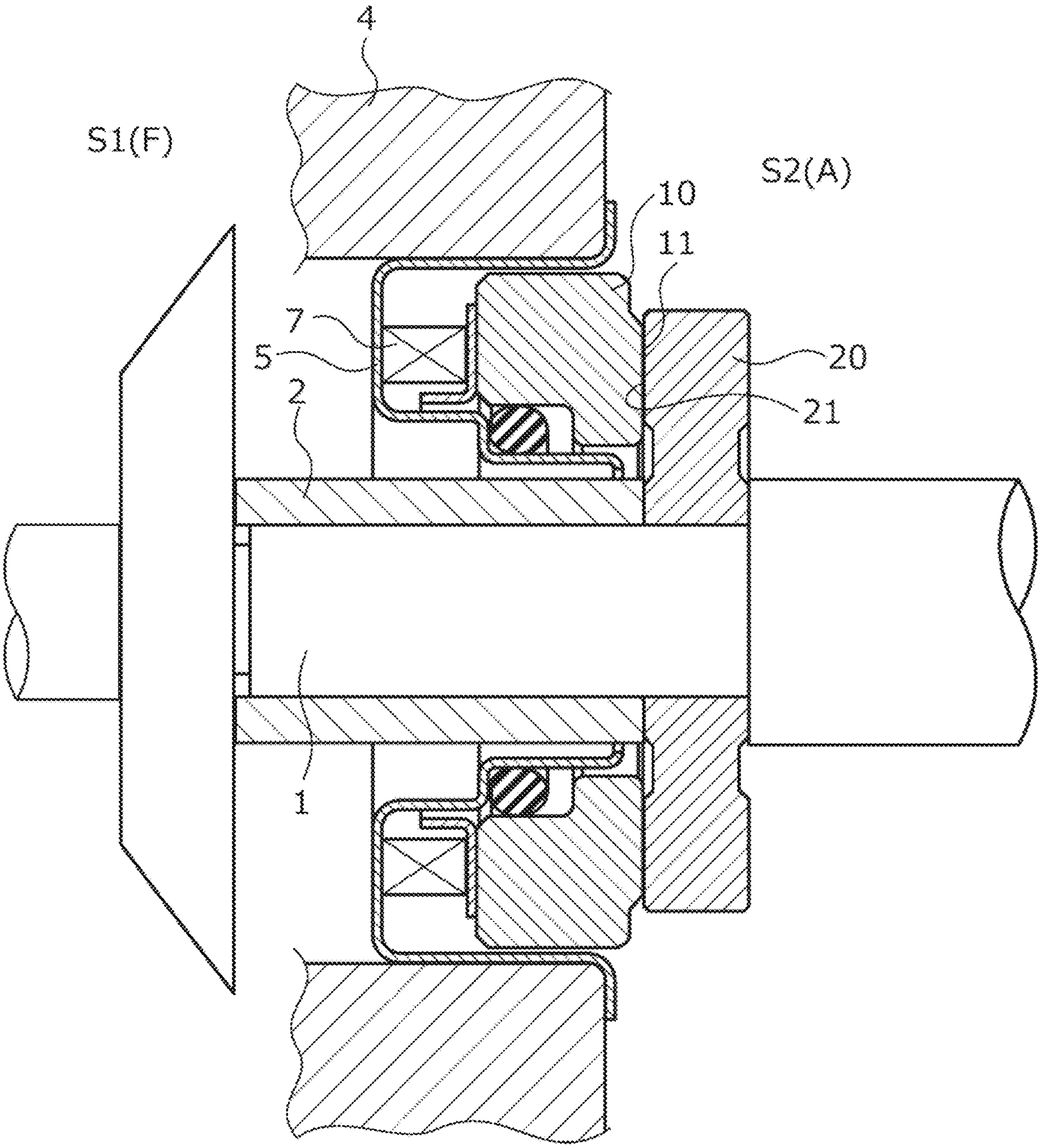
FIG. 1 is a longitudinal sectional view illustrating an example of a mechanical seal including a sliding component according to a first embodiment of the present invention.

Modes for carrying out a sliding component according to the present invention will be described on the basis of the embodiments.

First Embodiment

A sliding component according to a first embodiment of the present invention will be described with reference to FIGS. 1 to 5. Furthermore, in this embodiment, an example will be described in which the sliding component is a mechanical seal. Further, a description will be made on the assumption that a sealed fluid exists in an inner space of the mechanical seal, atmosphere exists in an outer space, an inner radial side of the sliding component constituting the mechanical seal is a sealed fluid side (high pressure side), and an outer radial side thereof a leakage side (low pressure side). Further, for convenience of description, dots may be added to grooves formed on the sliding surface in the drawings.

The mechanical seal for automobiles illustrated in FIG. 1 is of an outside type in which a sealed fluid F that tends to leak from the inner radial side of the sliding surface toward the outer radial side thereof is sealed and an outer space S2 communicates with atmosphere A. Furthermore, in this embodiment, an example is shown in which the sealed fluid F is a high-pressure liquid and the atmosphere A is a gas with a lower pressure than the sealed fluid F.

The mechanical seal mainly includes a rotating seal ring 20 which serves as an annular other sliding component and a stationary seal ring 10 which serves as an annular sliding component. The rotating seal ring 20 is provided on a rotating shaft 1 via a sleeve 2 to be rotatable together with the rotating shaft 1. The stationary seal ring 10 is provided in a non-rotating state and in an axially movable state on a sealing cover 5 fixed to a housing 4 of an attached device. The stationary seal ring 10 is biased in the axial direction by an elastic member 7 and a sliding surface 11 of the stationary seal ring 10 and a sliding surface 21 of the rotating seal ring 20 closely slide against each other. Furthermore, the sliding surface 21 of the rotating seal ring 20 is a flat surface and this flat surface is not provided with any recesses such as grooves.

The stationary seal ring 10 and the rotating seal ring 20 are typically made of SiC (as an example of hard material) or a combination of SiC and carbon (as an example of soft material), but the present invention is not limited thereto. For example, any sliding material can be applied insofar as it is used as a sliding material for a mechanical seal. Furthermore, the SiC includes a sintered body using boron, aluminum, carbon, or the like as a sintering aid and a material made of two or more types of phases having different components and compositions, examples of which include SiC in which graphite particles are dispersed, reaction-sintered SiC made of SiC and Si, SiC—TiC, and SiC—TiN. As the carbon, resin-molded carbon, sintered carbon, and the like can be used, including carbon in which carbon and graphite are mixed. In addition to the above sliding materials, a metal material, a resin material, a surface modification material (e.g., coating material), a composite material, and the like can also be applied.

Figure 2:
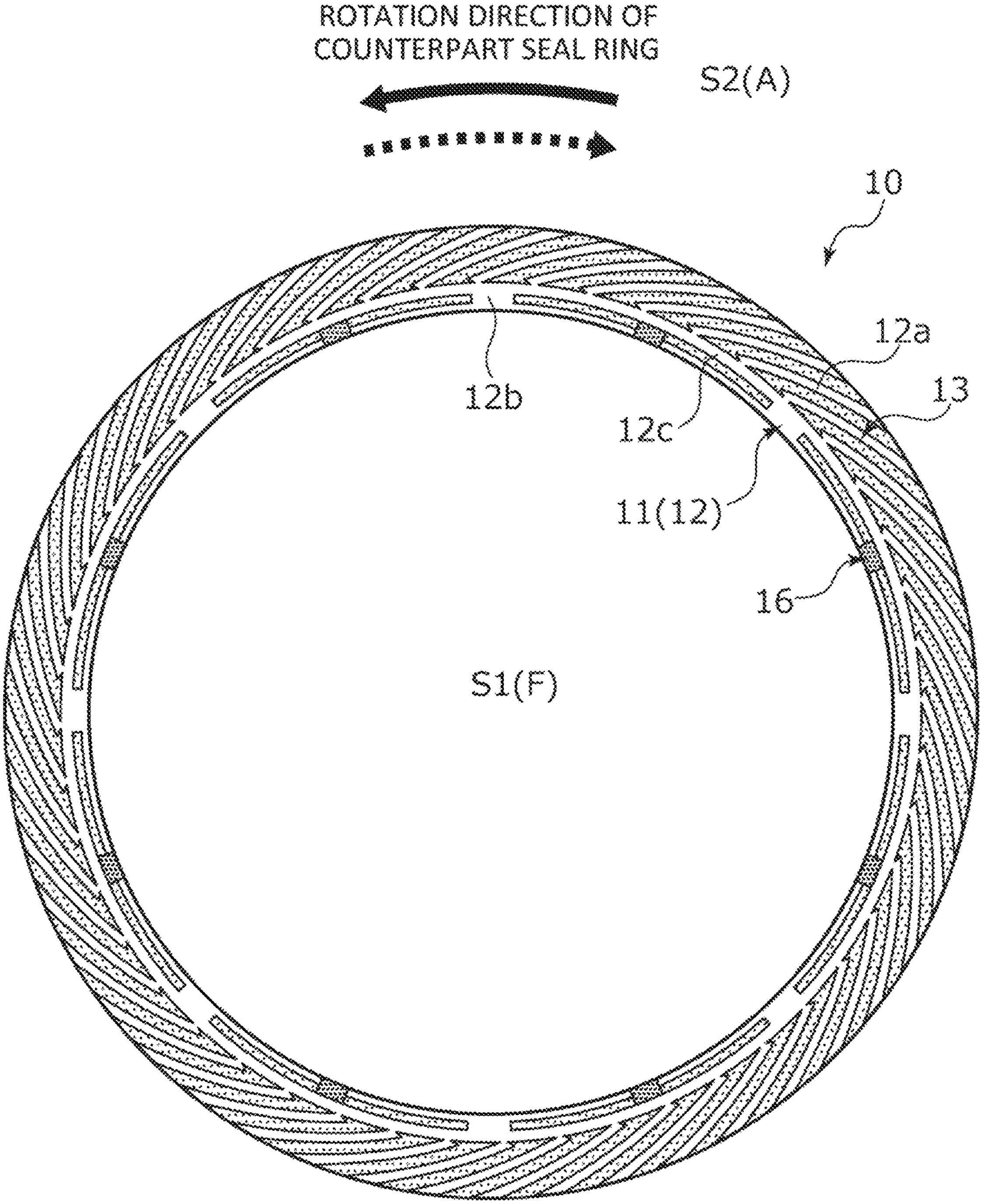
FIG. 2 is a view of a sliding surface of a stationary seal ring in the first embodiment when viewed from the axial direction.
Figure 3:
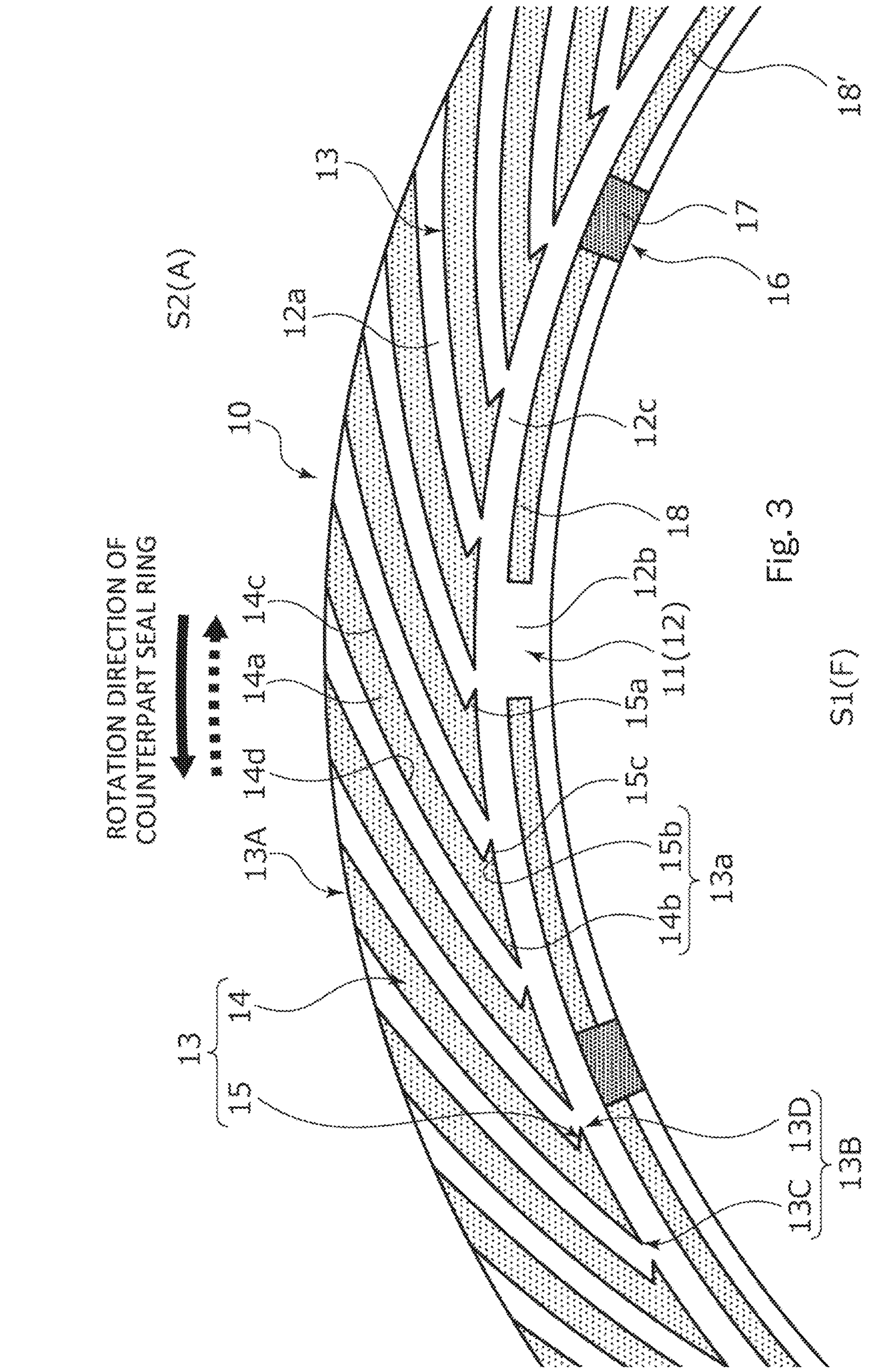
FIG. 3 is an enlarged view of the sliding surface of the stationary seal ring in the first embodiment when viewed from the axial direction.

As illustrated in FIGS. 2 and 3, the rotating seal ring 20 which is the mating seal ring is configured to slide relative to the stationary seal ring 10 counterclockwise as illustrated by the solid line arrow or clockwise as illustrated by the dotted line arrow, respectively. Hereinafter, the rotation direction indicated by a solid line arrow will be described as a forward rotation direction, and the rotation direction indicated by a dotted line arrow will be described as a backward rotation direction.

A plurality of dynamic pressure generating grooves 13 are arranged on the outer radial side of the sliding surface 11 of the stationary seal ring 10 at equal intervals in the circumferential direction and a plurality of fluid introduction grooves 16 are arranged on the inner radial side thereof at equal intervals in the circumferential direction as fluid input/output grooves. In this embodiment, the fluid introduction groove 16 has a function to input a fluid, but may also be used to output a fluid.

Further, the portion other than the fluid introduction groove 16 and the dynamic pressure generating groove 13 of the sliding surface 11 is a land 12 that forms a flat surface. Specifically, the land 12 includes a land portion 12*a* which is provided between the dynamic pressure generating grooves 13 adjacent to each other in the circumferential direction, a land portion 12*b* which is provided between the fluid introduction grooves 16 adjacent to each other in the circumferential direction, and a land portion 12*c* which is provided between the dynamic pressure generating groove 13 and the fluid introduction groove 16 separated from each other in the radial direction, and the upper surface (that is, the end surface in the axial direction) of each of these land portions is arranged on the same plane and constitutes a flat surface of the land 12.

As illustrated in FIG. 3, the dynamic pressure generating groove 13 includes an inclined groove 14 which extends from the outer radial side toward the inner radial side to generate a dynamic pressure and a reverse groove 15 which is formed continuously on the inner radial side of the inclined groove 14 and extends in a direction opposite to the inclined groove 14 in the circumferential direction to generate a dynamic pressure, and has a substantially L-shape in the axial direction, that is, a so-called hook shape.

The dynamic pressure generating groove 13 has an outer radial end 13A, that is, an outer radial end of the inclined groove 14 communicating with the outer space S2 and extends in an arc shape from the outer radial end 13A toward the inner radial side with an inclination in the forward rotation direction of the rotating seal ring 20.

A portion on the side of the forward rotation direction of an inner radial end 13B of the dynamic pressure generating groove 13, that is, an inner radial end portion of the inclined groove 14 becomes a pressure generating end portion 13C which is a first dynamic pressure generating end portion in a closed state. A portion on the backward rotation direction side of the inner radial end 13B of the dynamic pressure generating groove 13, that is, an end portion on the backward rotation direction side of the reverse groove 15 becomes a back pressure generating end portion 13D which is a second dynamic pressure generating end portion in a closed state. Furthermore, the pressure generating end portion 13C generates a positive pressure during forward rotation and the back pressure generating end portion 13D generates a positive pressure during backward rotation.

Furthermore, the dynamic pressure generating groove 13 is not limited to extending in an arc shape with an inclination in the forward rotation direction of the rotating seal ring 20, but may also extend, for example, in a linear shape with an inclination in the forward rotation direction of the rotating seal ring 20.

As illustrated in FIG. 3, the inclined groove 14 includes a bottom surface 14*a* which is flat in the extending direction and is parallel to the flat surface of the land 12, side wall portions 14*c* and 14*d* which extend perpendicularly from both side edges of the bottom surface 14*a* toward the flat surface of the land 12, and a wall portion 14*b* which is a wall surface extending perpendicularly from the inner radial edge of the bottom surface 14*a* toward the flat surface of the land 12. The bottom surface 14*a* has a substantially rectangular shape with substantially parallel both side wall portions 14*c* and 14*d*.

The pressure generating end portion 13C is a portion which is surrounded by the bottom surface 14*a*, the side wall portion 14*d*, and the wall portion 14*b* in the dynamic pressure generating groove 13. The pressure generating end portion 13C is tapered toward the forward rotation direction of the rotating seal ring 20 and forms an acute angle when viewed from the axial direction.

The reverse groove 15 includes a bottom surface 15*a* which is flat in the extending direction and parallel to the flat surface of the land 12, a side wall portion 15*c* which extends perpendicularly from the outer radial edge of the bottom surface 15*a* toward the flat surface of the land 12, and a wall portion 15*b* which is a wall surface extending perpendicularly from the inner radial edge of the bottom surface 15*a* toward the flat surface of the land 12. The side wall portion 15*c* extends in a linear shape when viewed from the axial direction. The bottom surface 15*a* has a substantially triangular shape.

The back pressure generating end portion 13D is a portion which is surrounded by the bottom surface 15*a*, the side wall portion 15*c*, and the wall portion 15*b* in the dynamic pressure generating groove 13. The back pressure generating end portion 13D is tapered toward the backward rotation direction of the rotating seal ring 20 and forms an acute angle when viewed from the axial direction.

Furthermore, in this embodiment, although it has been described that the side wall portion 15*c* extends in a linear shape when viewed from the axial direction, the present invention is not limited thereto, and the side wall portion may extend in other shapes such as an arc shape or a wave shape.

The wall portion 14*b* of the inclined groove 14 and the wall portion 15*b* of the reverse groove 15 are continuous in the circumferential direction without a bent portion. In other words, the wall portion 14*b* of the inclined groove 14 and the wall portion 15*b* of the reverse groove 15 are constituted by one arc-shaped wall portion 13*a* which is an arc-shaped surface extending in the circumferential direction concentrically with the stationary seal ring 10.

That is, the pressure generating end portion 13C and the back pressure generating end portion 13D are arranged on the same circumference of the sliding surface 11.

Further, the extending distance of the reverse groove 15 is shorter than the extending distance of the inclined groove 14.

Further, the depth of the reverse groove 15 is the same as the depth of the inclined groove 14. That is, the bottom surface 15*a* of the reverse groove 15 is disposed on the same plane as the bottom surface 14*a* of the continuous inclined groove 14 and forms a flat surface. Furthermore, the bottom surface 14*a* of the inclined groove 14 and the bottom surface 15*a* of the reverse groove 15 are not limited to being flat surfaces, and may have an inclination or unevenness. As illustrated in FIG. 3, the fluid introduction groove 16 includes a fluid guide groove portion 17 which communicates with an inner space S1 and Rayleigh steps 18 and 18' which serve as dynamic pressure generating portions extending in the circumferential direction concentrically with the stationary seal ring 10 from the outer radial side of the fluid guide groove portion 17 toward the forward rotation direction and the backward rotation direction of the rotating seal ring 20.

Furthermore, the fluid guide groove portion 17 is formed to be deeper than the depth dimension of the dynamic pressure generating groove 13. Further, the Rayleigh steps 18 and 18' are formed to have a depth shallower than the depth dimension of the fluid guide groove portion 17 and substantially the same as the depth dimension of the dynamic pressure generating groove 13. Furthermore, the fluid guide groove portion 17 may have the same depth dimension as the dynamic pressure generating groove 13. Further, the circumferential length of the Rayleigh steps 18 and 18' is formed to be longer than the circumferential length of one dynamic pressure generating groove 13 or the circumferential length of the fluid guide groove portion 17.

Next, the operation of the stationary seal ring 10 and the rotating seal ring 20 during relative rotation will be described with reference to FIGS. 4 and 5. Furthermore, in this embodiment, the rotating seal ring 20 will be described in the order of a stop state, a forward rotation state, and a backward rotation state.

First, a sealed fluid F flows into the fluid introduction groove 16 in a stop state in which the rotating seal ring 20 does not rotate. Furthermore, since the stationary seal ring 10 is biased toward the rotating seal ring 20 by the elastic member 7, the sliding surfaces 11 and 21 are in a contact state and almost no amount of the sealed fluid F between the sliding surfaces 11 and 21 leaks into the outer space S2.

Figure 4:
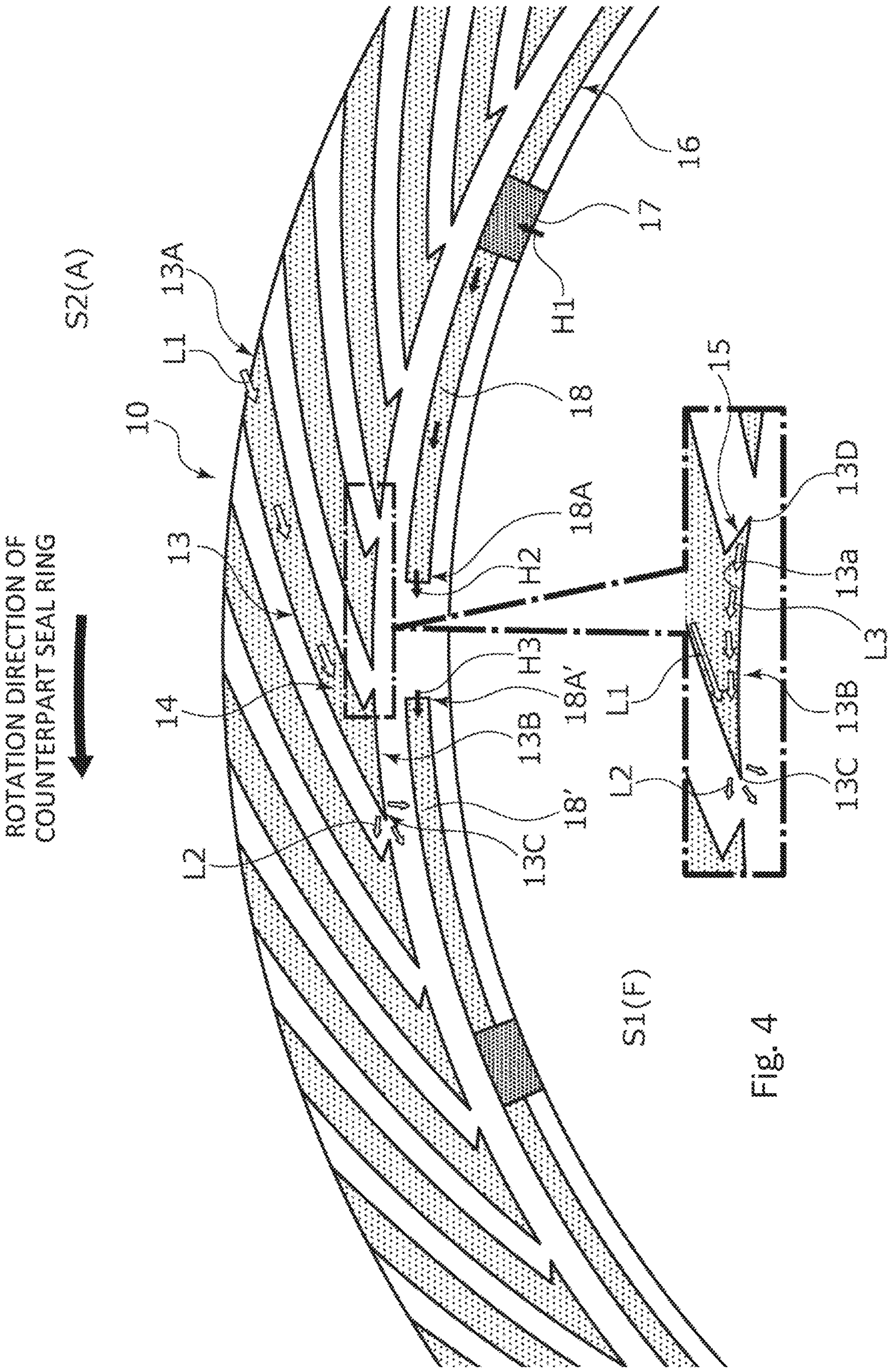
FIG. 4 is an explanatory diagram of the movement of a fluid of an inclined groove and a reverse inclined groove during forward rotation in the sliding surface of the stationary seal ring in the first embodiment when viewed from the axial direction.

As illustrated in FIG. 4, the sealed fluid F in the Rayleigh step 18 follows and moves in the forward rotation direction of the rotating seal ring 20 due to shearing with the sliding surface 21 at a low speed immediately after the rotating seal ring 20 starts to rotate relative to the stationary seal ring 10 in the forward rotation direction.

That is, in the fluid introduction groove 16, the sealed fluid F moves from the fluid guide groove portion 17 toward a downstream end portion 18A in the relative rotation direction of the Rayleigh step 18, and a force acts in the fluid guide groove portion 17 to draw the sealed fluid F as indicated by the arrow H1. Furthermore, the flows of the sealed fluid F and the atmosphere A in FIG. 4 are schematically illustrated without specifying the relative rotation speed of the rotating seal ring 20.

The pressure of the sealed fluid F having moved toward the end portion 18A of the Rayleigh step 18 is increased at or near the end portion 18A of the Rayleigh step 18. That is, a positive pressure is generated at or near the end portion 18A of the Rayleigh step 18.

Since the Rayleigh step 18 is shallow, a positive pressure is generated at or near the end portion 18A of the Rayleigh step 18 even when the movement amount of the sealed fluid F is small at the low rotation speed of the rotating seal ring 20.

Further, the sliding surfaces 11 and 21 are slightly separated from each other due to a force caused by the positive pressure generated at or near the end portion 18A of the Rayleigh step 18. Accordingly, the sealed fluid F flows from the end portion 18A of the Rayleigh step 18 (see the arrow H2) and the inner space S1 into a space between the sliding surfaces 11 and 21. In this way, since the sealed fluid F is interposed between the sliding surfaces 11 and 21, lubricity is improved even at the low rotation speed and wear between the sliding surfaces 11 and 21 can be suppressed. Furthermore, since the floating distance between the sliding surfaces 11 and 21 is small, the amount of the sealed fluid F leaking into the outer space S2 is small. Further, since the fluid guide groove portion 17 is provided, a large amount of the sealed fluid F can be held, and poor lubrication during low speed rotation can be avoided.

Further, since the sealed fluid F in the Rayleigh step 18' follows and moves in the forward rotation direction of the rotating seal ring 20 due to shearing with the sliding surface 21 at a low speed immediately after the rotating seal ring 20 starts to rotate relative to the stationary seal ring 10 in the forward rotation direction, a relative negative pressure is generated at or near an end portion 18A' of the Rayleigh step 18'. Therefore, the sealed fluid F flowing from the end portion 18A of the Rayleigh step 18 into a space between the sliding surfaces 11 and 21 is collected inward from the end portion 18A' as indicated by the arrow H3.

On the other hand, in the dynamic pressure generating groove 13, the atmosphere A is not dense enough in the dynamic pressure generating groove 13 and a high positive pressure is not generated at a low relative rotation speed between the rotating seal ring 20 and the stationary seal ring 10, and a force caused by the positive pressure generated by the dynamic pressure generating groove 13 is relatively smaller than a force caused by the positive pressure generated at or near the end portion 18A of the Rayleigh step 18. Thus, when the rotating seal ring 20 rotates at a low speed, the sliding surfaces 11 and 21 are separated from each other mainly by the force due to the positive pressure generated at or near the end portion 18A of the Rayleigh step 18.

When the relative rotation speed of the rotating seal ring 20 increases, the atmosphere A in the dynamic pressure generating groove 13 follows and moves in the forward rotation direction of the rotating seal ring 20 due to shearing with the sliding surface 21 and the atmosphere A of the outer space S2 is drawn into the dynamic pressure generating groove 13 as illustrated in FIG. 4. That is, in the dynamic pressure generating groove 13, a large amount of the atmosphere A moves from the outer radial end 13A toward the inner radial end 13B as indicated by the arrow L1.

Specifically, as illustrated in the enlarged part of FIG. 4, the flow of the atmosphere A flowing from the outer radial side of the inclined groove 14 toward the inner radial side thereof as indicated by the arrow L1 and a flow obtained by mixing the atmosphere A and the sealed fluid F flowing from the back pressure generating end portion 13D toward the pressure generating end portion 13C in the circumferential direction as indicated by the arrow L3 are generated at the inner radial end 13B of the dynamic pressure generating groove 13.

Specifically, since a negative pressure is formed at or near the back pressure generating end portion 13D compared to the periphery thereof, the sealed fluid F at or near the back pressure generating end portion 13D is sucked into the dynamic pressure generating groove 13. The sealed fluid F sucked into the dynamic pressure generating groove 13 moves toward the pressure generating end portion 13C at the same time when the atmosphere A flows as indicated by the arrow L3.

At this time, the sealed fluid F sucked into the dynamic pressure generating groove 13 smoothly moves from the back pressure generating end portion 13D toward the pressure generating end portion 13C along the arc-shaped wall portion 13*a* as indicated by the arrow L3.

Accordingly, both the flow of the atmosphere A indicated by the arrow L1 and the flow of the atmosphere A mixed with the sealed fluid F indicated by the arrow L3 are guided to the vicinity of the pressure generating end portion 13C and the pressure is increased to generate the positive pressure at or near the pressure generating end portion 13C.

In this way, a force caused by the positive pressure generated at or near the pressure generating end portion 13C is added to a force caused by the positive pressure generated at or near the end portion 18A of the Rayleigh step 18 and hence the sliding surfaces 11 and 21 are further separated from each other compared to a low speed state. Accordingly, the atmosphere A in the dynamic pressure generating groove 13 indicated by the arrow L2 mainly flows into a space between the sliding surfaces 11 and 21.

At this time, the atmosphere A mixed with the sealed fluid F indicated by the arrow L3 is pushed out from the pressure generating end portion 13C and the vicinity thereof toward the inner radial side, that is, the side of the sealed fluid F by the atmosphere A which has high energy such as flow velocity indicated by the arrow L1.

Further, the sealed fluid F sucked into the dynamic pressure generating groove 13 tends to form a lump at or near the pressure generating end portion 13C and is easily discharged into a space between the sliding surfaces 11 and 21 by the atmosphere A (see the arrow L1) flowing through the dynamic pressure generating groove 13.

Since the atmosphere A in the dynamic pressure generating groove 13 indicated by the arrow L1 acts to push the sealed fluid F near the pressure generating end portion 13C of the dynamic pressure generating groove 13 toward the inner space Si, there is little sealed fluid F leaking into the dynamic pressure generating groove 13 or the outer space S2.

Further, since a part of the sealed fluid F discharged from the pressure generating end portion 13C into a space between the sliding surfaces 11 and 21 as indicated by the arrow L2 is sucked into the back pressure generating end portion 13D of another dynamic pressure generating groove 13 adjacent in the forward rotation direction, there is little sealed fluid F leaking into the outer space S2.

Since the sliding component of this embodiment is designed so that the positive pressure generation capacity of the entire dynamic pressure generating groove 13 is sufficiently larger than the positive pressure generation capacity of the entire fluid introduction groove 16 during forward high-speed rotation, it finally becomes a state in which only the atmosphere A exists between the sliding surfaces 11 and 21, that is, a gas lubrication state.

In this way, when the rotating seal ring 20 starts to rotate relative to the stationary seal ring 10 in the forward rotation direction, the sliding surfaces 11 and 21 are lubricated by the sealed fluid F flowing out from the fluid introduction groove 16 into a space between the sliding surfaces 11 and 21. In a high-speed rotation state, the sliding surfaces 11 and 21 are separated from each other by the positive pressure generated by the atmosphere A in the dynamic pressure generating groove 13, and the sealed fluid F and the atmosphere A are introduced into a space between the sliding surfaces 11 and 21 to increase the lubricity.

Accordingly, it is possible to suppress the wear of the sliding surfaces 11 and 21 from the relative rotation start state to the high-speed rotation state.

Next, the backward rotation state of the rotating seal ring 20 will be described with reference to FIG. 5. As illustrated in FIG. 5, when the rotating seal ring 20 rotates in the backward rotation direction relative to the stationary seal ring 10, the sealed fluid F in the Rayleigh step 18 follows and moves in the backward rotation direction of the rotating seal ring 20 due to shearing with the sliding surface 21. Accordingly, the sealed fluid enters the fluid guide groove portion 17 on the downstream side in the relative rotation direction so that a force acts to push out a part of the sealed fluid F in the fluid guide groove portion 17 as indicated by the arrow H1'. Furthermore, the flow of the sealed fluid F or the atmosphere A in FIG. 5 is schematically illustrated without specifying the relative rotation speed of the rotating seal ring 20.

On the other hand, the sealed fluid F in the Rayleigh step 18' follows and moves in the backward rotation direction of the rotating seal ring 20 due to shearing with the sliding surface 21 and a positive pressure is generated at or near the end portion 18A'. Accordingly, the sealed fluid F flows from the end portion 18A' of the Rayleigh step 18' (see the arrow H3') and the inner space S1 into a space between the sliding surfaces 11 and 21.

At this time, the sealed fluid F existing in the land portion 12*b* (see FIG. 3) between the adjacent fluid introduction grooves 16 or the land portion 12*c* (see FIG. 3) between the dynamic pressure generating groove 13 and the fluid introduction groove 16 separated from each other in the radial direction is sucked into the fluid introduction groove 16 as indicated by the arrow H2' by the negative pressure generated at or near the end portion 18A of the Rayleigh step 18 and this tendency is noticeable near the end portion 18A.

In this way, when the rotating seal ring 20 rotates reversely relative to the stationary seal ring 10, a large amount of the sealed fluid F sucked into the fluid introduction groove 16 is held in the fluid guide groove portion 17 and is supplied from the end portion 18A' of the Rayleigh step 18' into a space between the sliding surfaces 11 and 12, poor lubrication can be avoided.

Figure 5:
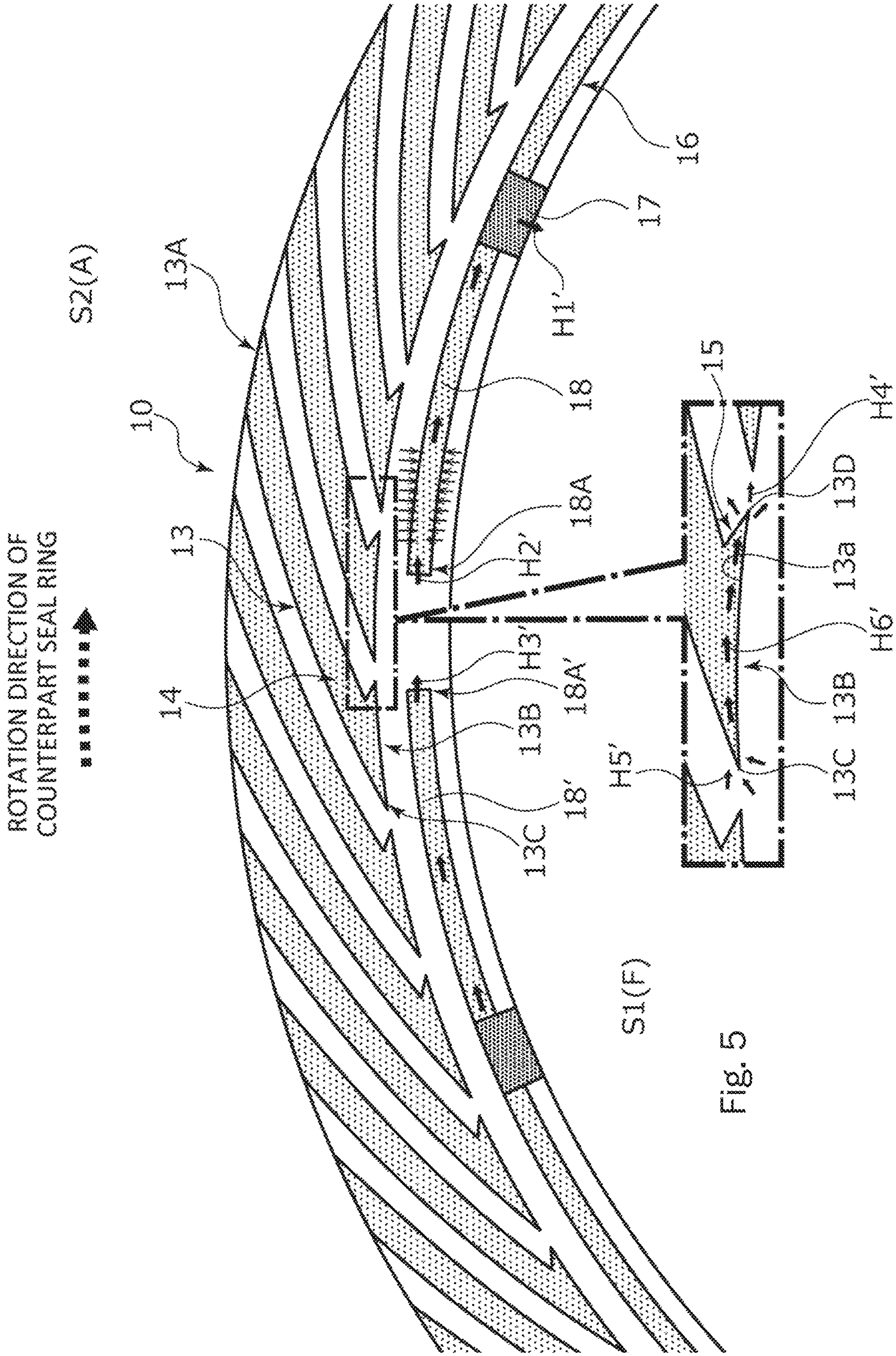
FIG. 5 is an explanatory diagram of the movement of the fluid of the inclined groove and the reverse inclined groove during backward rotation in the sliding surface of the stationary seal ring in the first embodiment when viewed from the axial direction.

On the other hand, in the dynamic pressure generating groove 13, as illustrated in FIG. 5, the sealed fluid F entering the dynamic pressure generating groove 13 follows and moves in the backward rotation direction of the rotating seal ring 20 due to shearing with the sliding surface 21. That is, in the dynamic pressure generating groove 13, as illustrated in the enlarged part of FIG. 5, the sealed fluid F flows in the circumferential direction from the pressure generating end portion 13C toward the back pressure generating end portion 13D as indicated by the arrow H6'.

At this time, the sealed fluid F sucked into the dynamic pressure generating groove 13 indicated by the arrow H6' smoothly moves from the pressure generating end portion 13C to the back pressure generating end portion 13D along the arc-shaped wall portion 13*a*.

The pressure of the sealed fluid F having moved toward the back pressure generating end portion 13D is increased at or near the back pressure generating end portion 13D. That is, a positive pressure is generated at or near the back pressure generating end portion 13D.

Further, the sliding surfaces 11 and 21 are slightly separated from each other by a force caused by the positive pressure generated at or near the back pressure generating end portion 13D. Accordingly, the sealed fluid F in the dynamic pressure generating groove 13 indicated by the arrow H4' mainly flows into a space between the sliding surfaces 11 and 21.

Since the sealed fluid F flowing out from the back pressure generating end portion 13D as indicated by the arrow H4' acts to push out the sealed fluid F near the back pressure generating end portion 13D of the dynamic pressure generating groove 13 toward the inner space S1, there is little sealed fluid F leaking into the dynamic pressure generating groove 13 or the outer space S2.

At this time, the sealed fluid F existing near the pressure generating end portion 13C is sucked into the dynamic pressure generating groove 13 as indicated by the arrow H5' due to the negative pressure generated at or near the pressure generating end portion 13C.

In this way, since the dynamic pressure generating groove 13 includes the inclined groove 14 and the reverse groove 15 having different rotation directions mainly used to generate a dynamic pressure, it is possible to suppress wear by separating the sliding surfaces 11 and 21 during both rotations and to suppress the sealed fluid F from leaking from a space between the sliding surfaces 11 and 21 into the outer space S2.

As described above, the pressure generating end portion 13C is disposed on the same circumference as the back pressure generating end portion 13D in the sliding surface 11.

Accordingly, since the sealed fluid F sucked by the back pressure generating end portion 13D is moved toward the pressure generating end portion 13C disposed on the same circumference during the forward rotation of the rotating seal ring 20, the sealed fluid F sucked by the back pressure generating end portion 13D can be easily discharged from the pressure generating end portion 13C into a space between the sliding surfaces 11 and 21.

Specifically, since the dynamic pressure generating groove 13 is not provided with a surface that functions to move the flow flowing from the back pressure generating end portion 13D toward the pressure generating end portion 13C in the circumferential direction (see the arrow L3 of FIG. 4) toward the outer space S2 during the forward rotation of the rotating seal ring 20, the sealed fluid F sucked by the back pressure generating end portion 13D can be easily moved toward the pressure generating end portion 13C.

Further, since the flow of the atmosphere A flowing from the outer radial side of the inclined groove 14 toward the inner radial side thereof (see the arrow L1 of FIG. 4) and the flow of the fluid flowing from the back pressure generating end portion 13D toward the pressure generating end portion 13C in the circumferential direction (see the arrow L3 of FIG. 4) are suppressed from interfering with each other in the vicinity of the pressure generating end portion 13C, that is, the flows L1 and L3 move in substantially the same direction and merge during the forward rotation of the rotating seal ring 20, a positive pressure can be stably generated at the pressure generating end portion 13C.

Further, since the back pressure generating end portion 13D is disposed on the side of the inner space S1 of the inclined groove 14, that is, the closed end portion of the inclined groove 14, a positive pressure is easily generated by the reverse groove 15 during the backward rotation of the rotating seal ring 20.

Further, since the dynamic pressure generating groove 13 is disposed at a plurality of positions in the circumferential direction and the pressure generating end portion 13C and the back pressure generating end portion 13D are arranged on the same circumference in the sliding surface 11, the sealed fluid F flowing out from the pressure generating end portion 13C into a space between the sliding surfaces 11 and 21 during the forward rotation of the rotating seal ring 20 is easily collected by back pressure generating end portion 13D of another dynamic pressure generating groove 13 adjacent in the forward rotation direction.

Further, the sealed fluid F flowing out from the back pressure generating end portion 13D into a space between the sliding surfaces 11 and 21 during the backward rotation of the rotating seal ring 20 is easily collected by the pressure generating end portion 13C of another dynamic pressure generating groove 13 adjacent in the backward rotation direction.

Further, since the pressure generating end portion 13C forms an acute angle that is tapered in the forward rotation direction when viewed from the axial direction, the fluid in the dynamic pressure generating groove 13 is easily converged during the forward rotation of the rotating seal ring 20 and the positive pressure generating effect of the pressure generating end portion 13C is high.

Further, since the back pressure generating end portion 13D forms an acute angle that is tapered in the backward rotation direction when viewed from the axial direction, the fluid in the dynamic pressure generating groove 13 is easily converged during the backward rotation of the rotating seal ring 20 and the positive pressure generating effect of the back pressure generating end portion 13D is high.

Further, the wall portion 14*b* of the inclined groove 14 and the wall portion 15*b* of the reverse groove 15 are constituted by one arc-shaped wall portion 13*a* extending in the circumferential direction without a bent portion. In other words, since the pressure generating end portion 13C and the back pressure generating end portion 13D are continuous by the same arc-shaped wall portion 13*a*, a fluid can be smoothly moved between the pressure generating end portion 13C and the back pressure generating end portion 13D.

Further, since the sliding surface 11 is provided with the fluid introduction groove 16 which communicates with the inner space S1 and introduces the sealed fluid F, the lubricity between the sliding surfaces 11 and 21 at a low relative rotation speed can be improved.

Further, since the fluid introduction groove 16 includes the Rayleigh steps 18 and 18' as the dynamic pressure generating portion, the Rayleigh steps 18 and 18' can cause a positive pressure so that the sliding surfaces 11 and 21 are slightly separated from each other and the sealed fluid F is introduced into a space between the sliding surfaces 11 and 21. Accordingly, the lubricity between the sliding surfaces 11 and 21 can be improved.

Further, since the outer radial end 13A of the dynamic pressure generating groove 13 communicates with the outer space S2, the atmosphere A of the outer space S2 is easily introduced from the outer radial end 13A during forward rotation. Further, since a positive pressure is easily generated by the atmosphere A at the pressure generating end portion 13C, the dynamic pressure effect can be improved.

Further, since the extending distance of the reverse groove 15 is shorter than that of the inclined groove 14, the positive pressure can be early generated by the reverse groove 15 during backward rotation.

Second Embodiment

Figure 6:
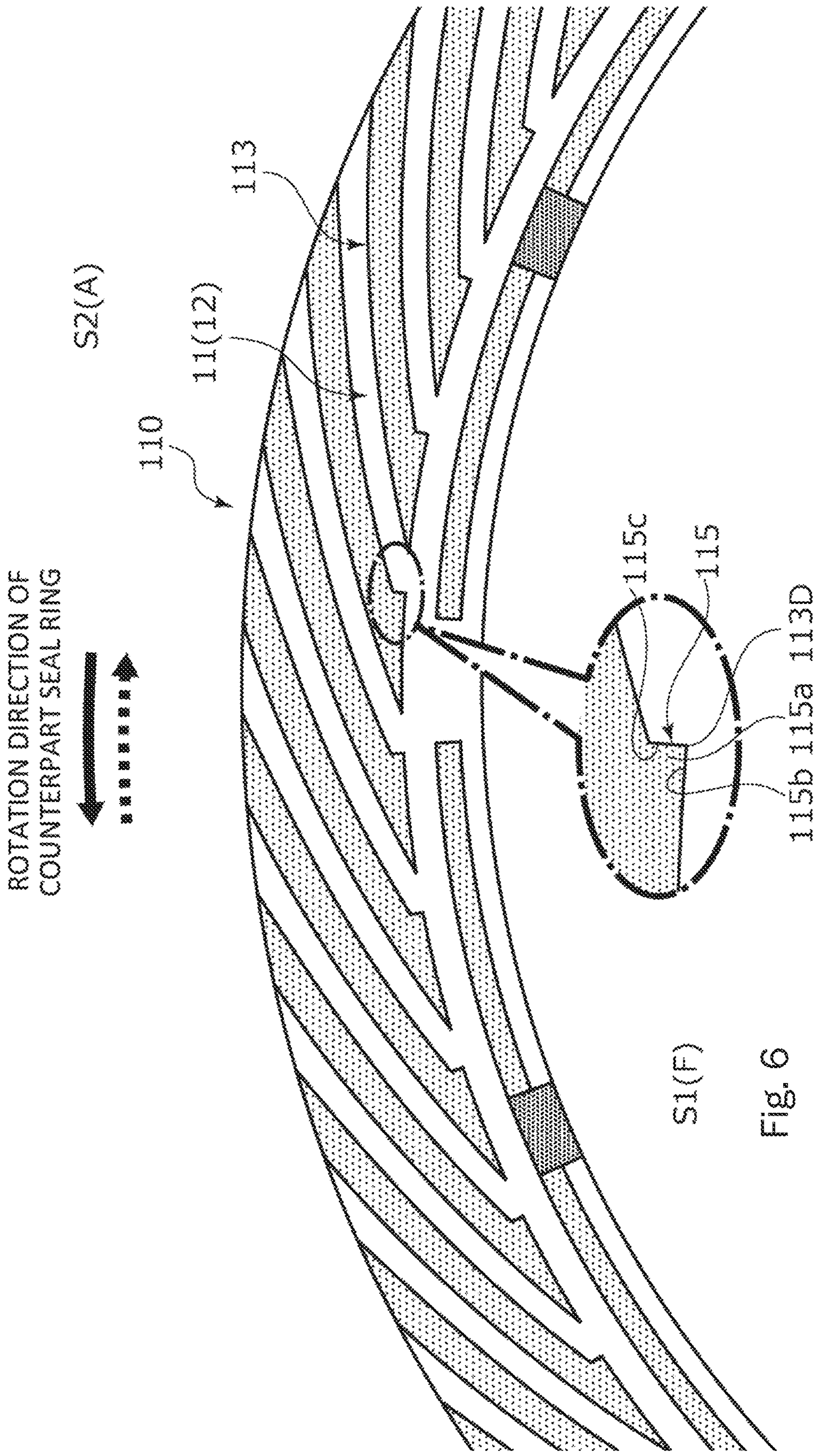
FIG. 6 is an enlarged view of a sliding surface of a stationary seal ring as a sliding component according to a second embodiment of the present invention when viewed from the axial direction.

Next, a sliding component according to a second embodiment of the present invention will be described with reference to FIG. 6. Furthermore, description of the same configuration and overlapping configuration as in the first embodiment described above will be omitted.

In a stationary seal ring 110 which is a sliding component of in the second embodiment, a reverse groove 115 of a dynamic pressure generating groove 113 has a shape different from that of the reverse groove 15 of the first embodiment and the other configurations are the same as those of the first embodiment.

The reverse groove 115 includes a bottom surface 115*a* which is flat in the extending direction and is parallel to the flat surface of the land 12, a side wall portion 115*c* which extends perpendicularly from the outer radial edge of the bottom surface 115*a* toward the flat surface of the land 12, and a wall portion 115*b* which is a wall surface extending perpendicularly from the inner radial edge of the bottom surface 115*a* toward the flat surface of the land 12.

The corner formed by the side wall portion 115*c* and the wall portion 115*b*, that is, the back pressure generating end portion 113D forms a substantially right angle when viewed from the axial direction.

Third Embodiment

Figure 7:
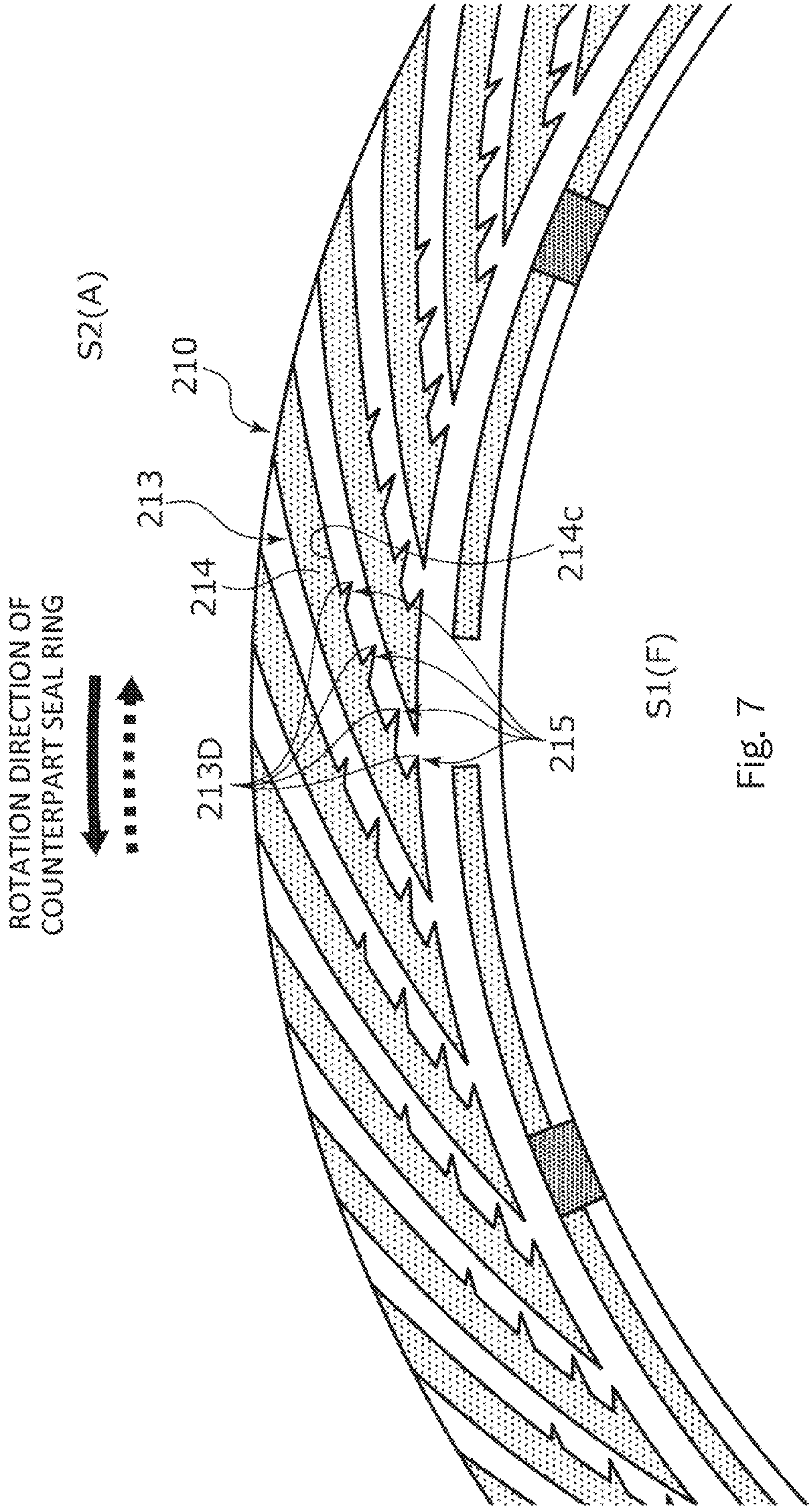
FIG. 7 is an enlarged view of the sliding surface of the stationary seal as a sliding component according to a third embodiment of the present invention when viewed from the axial direction.

Next, a sliding component according to a third embodiment of the present invention will be described with reference to FIG. 7. Furthermore, description of the same configuration and overlapping configuration as in the first embodiment described above will be omitted.

In a stationary seal ring 210 which is a sliding component in the third embodiment, a dynamic pressure generating groove 213 has a shape different from that of the dynamic pressure generating groove 13 of the first embodiment and the other configurations are the same as those of the first embodiment.

In the dynamic pressure generating groove 213, a plurality of reverse grooves 215 are provided with respect to an inclined groove 214. Specifically, the reverse groove 215 extends in the backward rotation direction from a side wall portion 214*c* of the inclined groove 214 in the backward rotation direction and is provided at four positions to be away from each other in the longitudinal direction of the inclined groove 214. These back pressure generating end portions 213D are tapered in the backward rotation direction and form an acute angle when viewed from the axial direction. Further, the inner radial wall of the reverse groove 215 on the most inner radial side is smoothly connected to the inner radial wall of the inclined groove 214 disposed on the same circumference.

Accordingly, since a positive pressure can be generated at or near each back pressure generating end portion 213D during the backward rotation of the rotating seal ring 20, the dynamic pressure effect can be obtained almost throughout the entire radial direction. Accordingly, it is easier to separate the sliding surfaces from each other.

Further, the sealed fluid F at or near the back pressure generating end portion 213D of each reverse groove 215 can be sucked and collected into the dynamic pressure generating groove 213 during the forward rotation of the rotating seal ring 20.

Figure 8:
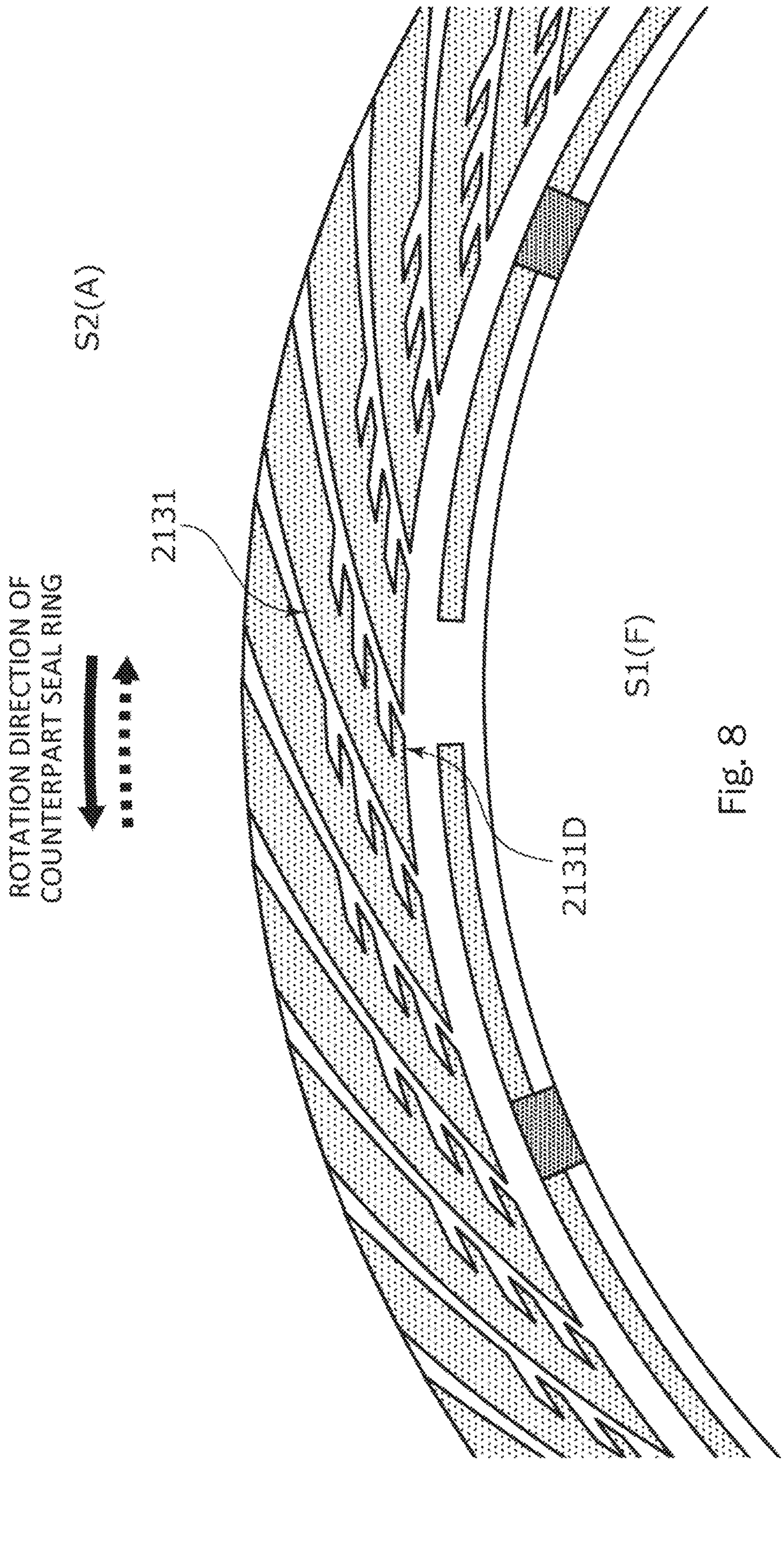
FIG. 8 is a schematic view illustrating Modified Example 3-1 in the third embodiment of the present invention.

Furthermore, as Modified Example 3-1 of the dynamic pressure generating groove 213 in the third embodiment, as illustrated in FIG. 8, a back pressure generating end portion 2131D of a dynamic pressure generating groove 2131 has a substantially rectangular shape when viewed from the axial direction.

Accordingly, since the plurality of back pressure generating end portions 2131D are provided in the radial direction, the dynamic pressure effect can be obtained almost throughout the entire radial direction during the backward rotation of the rotating seal ring 20. Accordingly, it is easier to separate the sliding surfaces.

Figure 9:
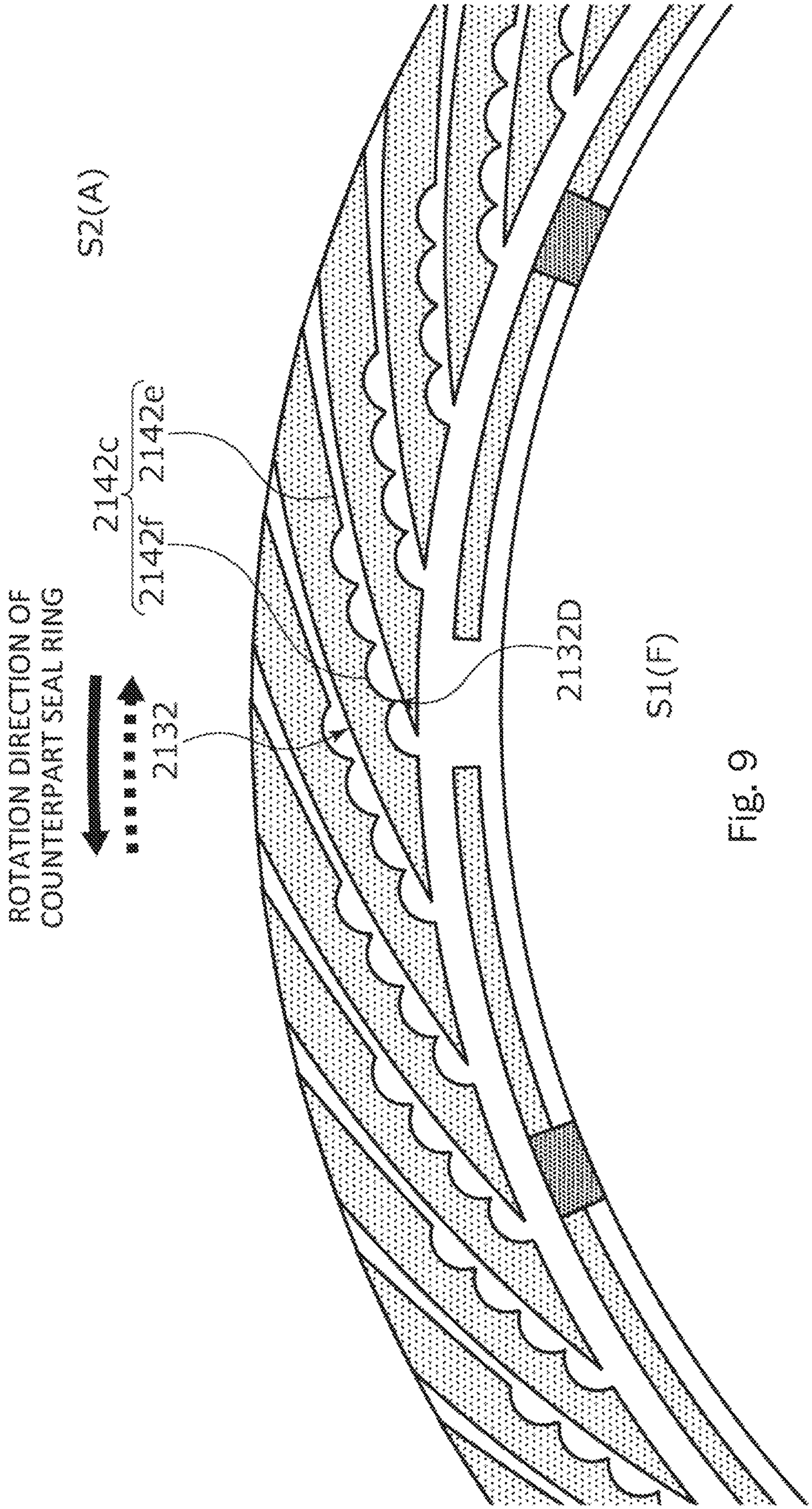
FIG. 9 is a schematic view illustrating Modified Example 3-2 in the third embodiment of the present invention.

Further, as Modified Example 3-2 of the dynamic pressure generating groove 213 in the third embodiment, as illustrated in FIG. 9, a back pressure generating end portion 2132D of a dynamic pressure generating groove 2132 is tapered in the backward rotation direction and the inner radial direction.

Specifically, a side wall portion 2142*c* of the dynamic pressure generating groove 2132 includes an outer radial portion 2142*e* and an inner radial portion 2142*f*.

The outer radial portion 2142*e* extends in a substantially semicircular arc-shaped shape from the outer radial side toward the inner radial side to be inclined in the forward rotation direction.

The inner radial portion 2142*f* has a shape in which an arc-shaped surface protruding in the forward rotation direction and the outer radial direction when viewed from the axial direction is continuous in the radial direction. The end portions of the adjacent arc-shaped surfaces serve as the back pressure generating end portion 2132D.

Accordingly, since the plurality of back pressure generating end portions 2132D are provided in the radial direction, the dynamic pressure effect can be obtained almost throughout the entire radial direction during the backward rotation of the rotating seal ring 20. Accordingly, it is easier to separate the sliding surfaces from each other. In addition, since the back pressure generating end portion 2132D faces the inner radial direction, the sealed fluid F can be easily pushed out to the inner radial side and the sealing performance during the backward rotation of the rotating seal ring 20 can be improved.

Figure 10:
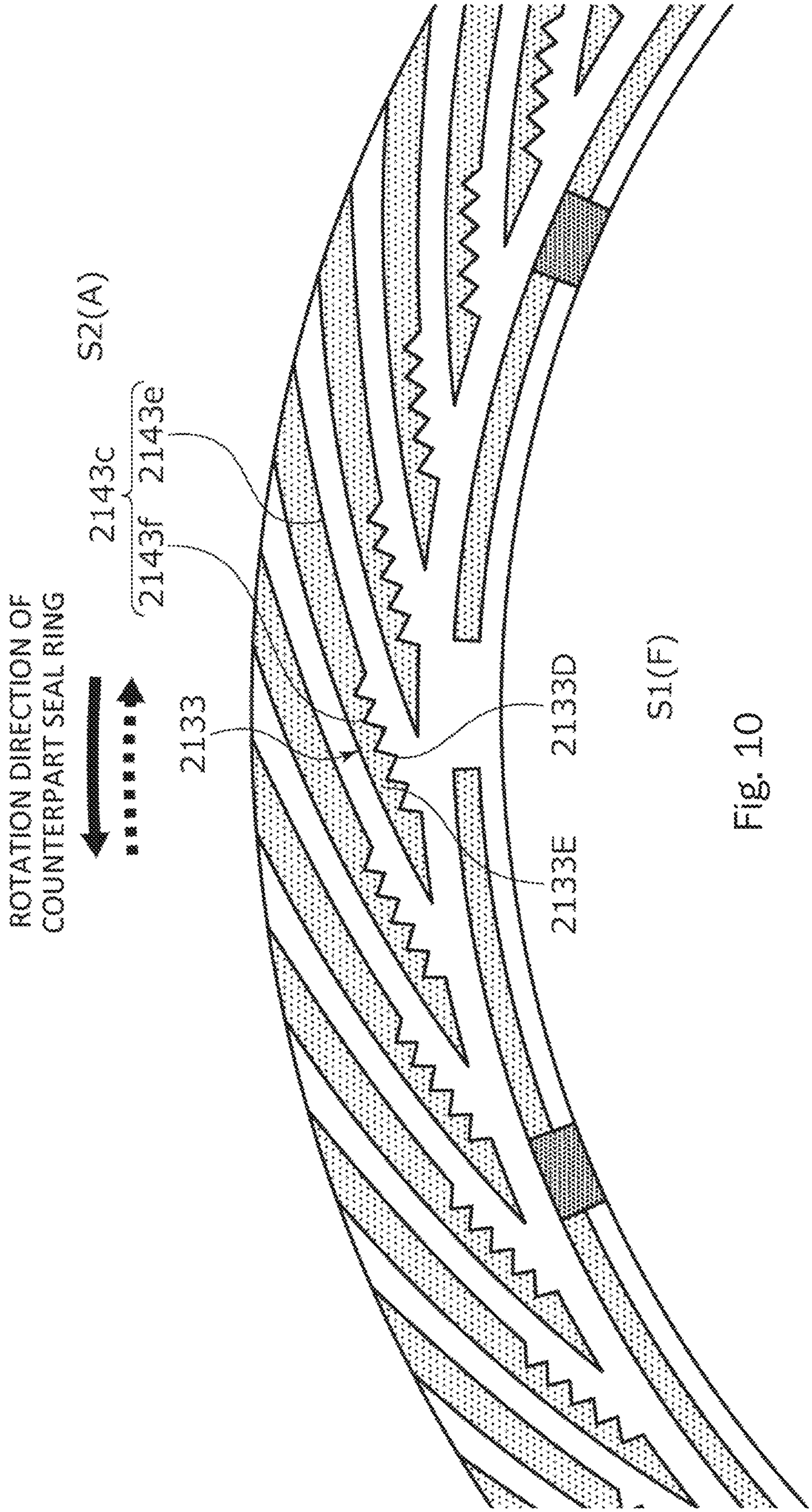
FIG. 10 is a schematic view illustrating Modified Example 3-3 in the third embodiment of the present invention.

Further, as Modified Example 3-3 of the dynamic pressure generating groove 213 of the third embodiment, as illustrated in FIG. 10, a back pressure generating end portion 2133D of a dynamic pressure generating groove 2133 is tapered in the backward rotation direction and the inner radial direction and has a substantially triangular shape when viewed from the axial direction.

A side wall portion 2143*c* of the dynamic pressure generating groove 2133 includes an outer radial portion 2143*e* and an inner radial portion 2143*f*.

The outer radial portion 2143*e* extends in an arc shape from the outer radial side toward the inner radial side to be inclined in the forward rotation direction.

The inner radial portion 2143*f* has a zigzag shape in which convex peaks in the forward rotation direction and the outer radial direction are continuous in the radial direction when viewed from the axial direction, that is, a so-called sawtooth shape. That is, a plurality of narrow portions 2133E having a narrow circumferential width are provided in the radial direction of the dynamic pressure generating groove 2133. Further, the valley of the inner radial portion 2143*f* is the back pressure generating end portion 2133D.

Accordingly, a positive pressure by the atmosphere A is easily generated by the plurality of narrow portions 2133E provided in the radial direction of the dynamic pressure generating groove 2133 during the forward rotation of the rotating seal ring 20.

Further, since the plurality of back pressure generating end portions 2133D are provided in the radial direction, the dynamic pressure effect can be obtained almost throughout the entire radial direction during the backward rotation of the rotating seal ring 20. Accordingly, it is easier to separate the sliding surfaces from each other. In addition, since the back pressure generating end portion 2133D faces the inner radial direction, the sealed fluid F can be easily pushed out to the inner radial side and the sealing performance during the backward rotation of the rotating seal ring 20 can be improved.

Figure 11:
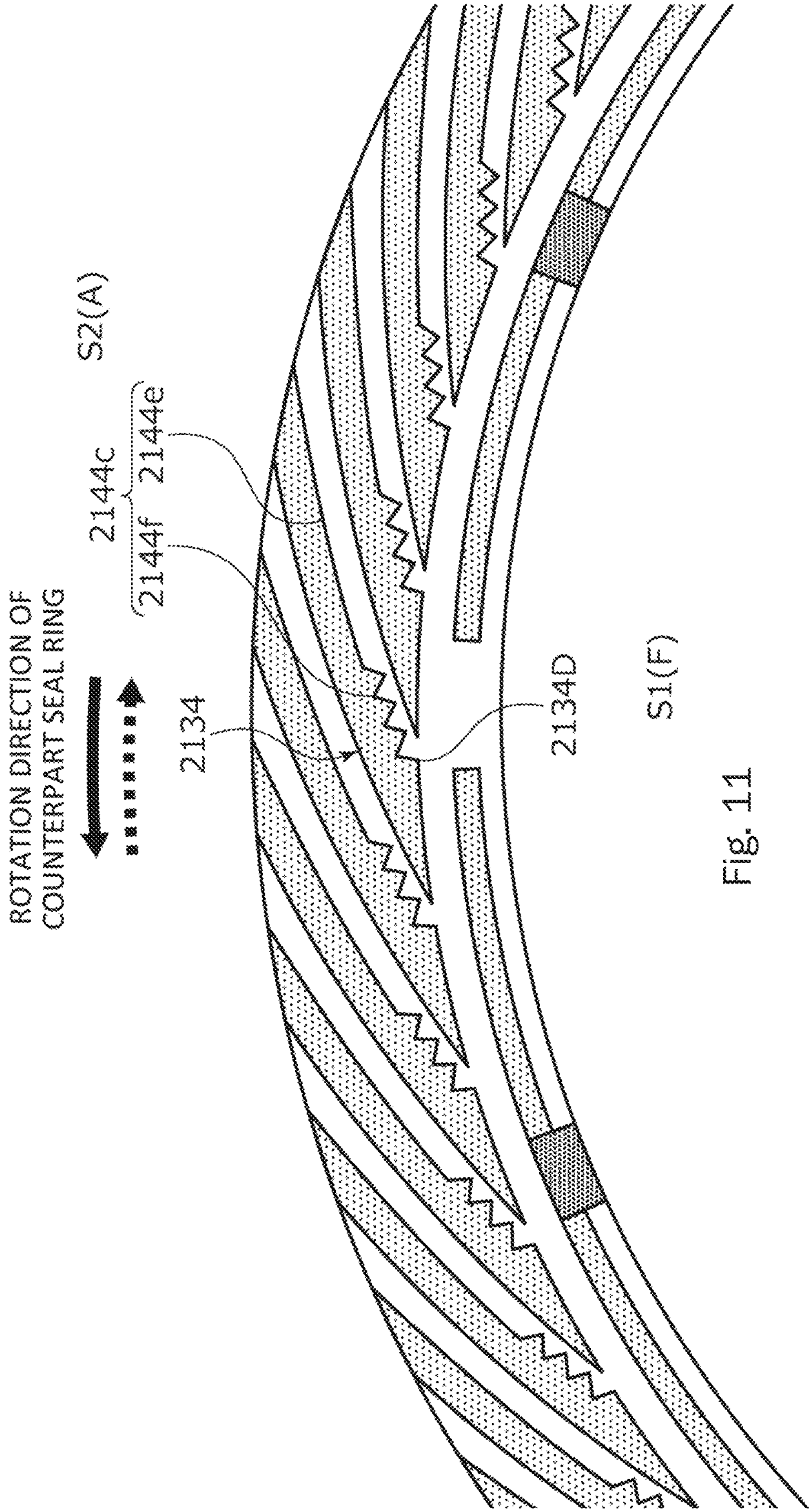
FIG. 11 is a schematic view illustrating Modified Example 3-4 in the third embodiment of the present invention.

Further, as Modified Example 3-4 of the dynamic pressure generating groove 213 in the third embodiment, as illustrated in FIG. 11, a back pressure generating end portion 2134D of a dynamic pressure generating groove 2134 is tapered in the backward rotation direction and the inner radial direction and has a substantially triangular shape when viewed from the axial direction.

A side wall portion 2144*c* of the dynamic pressure generating groove 2134 includes an outer radial portion 2144*e* and an inner radial portion 2144*f*.

The outer radial portion 2144*e* extends in an arc shape from the outer radial side toward the inner radial side to be inclined in the forward rotation direction.

The inner radial portion 2144*f* has a zigzag shape in which convex peaks in the backward rotation direction and the inner radial direction are continuous in the radial direction when viewed from the axial direction, that is, a so-called sawtooth shape. The peak of the inner radial portion 2144*f* is the back pressure generating end portion 2134D. That is, the circumferential width of the dynamic pressure generating groove 2134 is enlarged by the back pressure generating end portion 2134D.

Accordingly, since the plurality of back pressure generating end portions 2134D are provided in the radial direction, the dynamic pressure effect can be obtained almost throughout the entire radial direction during the backward rotation of the rotating seal ring 20. Accordingly, it is easier to separate the sliding surfaces from each other. In addition, since the back pressure generating end portion 2134D faces the inner radial direction, the sealed fluid F can be easily pushed out to the inner radial side and the sealing performance during the backward rotation of the rotating seal ring 20 can be improved.

Figure 12:
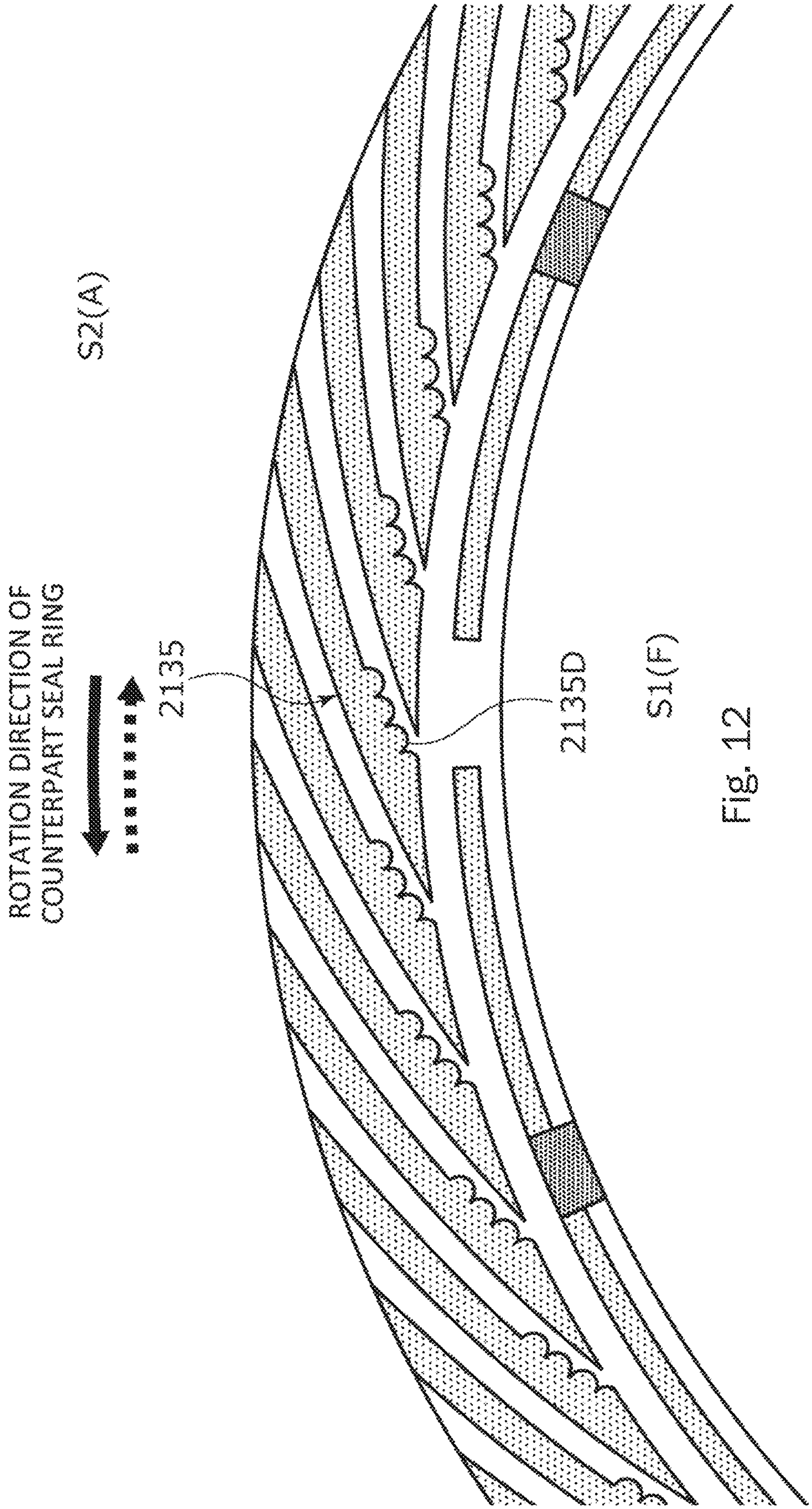
FIG. 12 is a schematic view illustrating Modified Example 3-5 in the third embodiment of the present invention.

Further, as Modified Example 3-5 of the dynamic pressure generating groove 213 in the third embodiment, as illustrated in FIG. 12, a back pressure generating end portion 2135D of a dynamic pressure generating groove 2135 has a substantially circular arc-shaped shape with a protruding strip facing in the backward rotation direction and the inner radial direction when viewed from the axial direction.

Accordingly, since the plurality of back pressure generating end portions 2135D are provided in the radial direction, the dynamic pressure effect can be obtained almost throughout the entire radial direction during the backward rotation of the rotating seal ring 20. Accordingly, it is easier to separate the sliding surfaces from each other.

Furthermore, in the third embodiment and Modified Example 3-1 to Modified Example 3-5, the number of the back pressure generating end portions can be freely set. Further, the back pressure generating end portion may be provided over the entire length of the side wall portion on the backward rotation direction side of the dynamic pressure generating groove.

Fourth Embodiment

Figure 13:
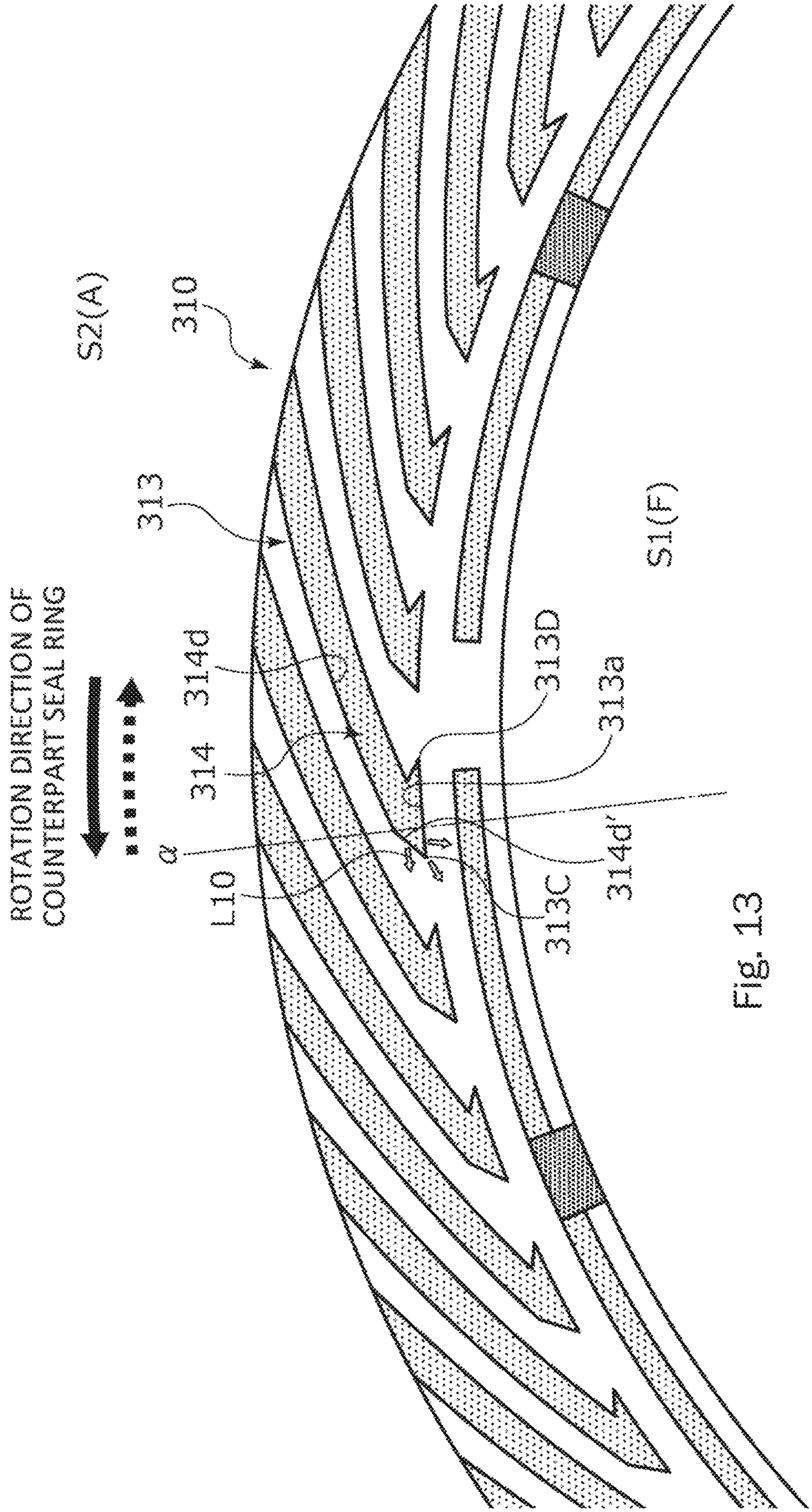
FIG. 13 is an enlarged view of a sliding surface of a stationary seal ring as a sliding component according to a fourth embodiment of the present invention when viewed from the axial direction.

Next, a sliding component according to a fourth embodiment of the present invention will be described with reference to FIG. 13. Furthermore, description of the same configuration and overlapping configuration as in the first embodiment described above will be omitted.

In a stationary seal ring 310 which is a sliding component in the fourth embodiment, a dynamic pressure generating groove 313 has a shape different from that of the dynamic pressure generating groove 13 of the first embodiment and the other configurations are the same as those of the first embodiment.

An inner radial end of a side wall portion **314*d* in the forward rotation direction of an inclined groove 314 of the dynamic pressure generating groove 313 is further provided with a side wall portion 314*d*' which extends radially inward to be inclined radially inward. The angle of the bent portion formed by the side wall portion 314*d* and the side wall portion 314*d*'** is larger than 90 degrees and smaller than 180 degrees.

A pressure generating end portion 313C which forms an acute angle when viewed from the axial direction is constituted by the side wall portion **314*d*' and an arc-shaped wall portion 313*a***.

The pressure generating end portion 313C and a back pressure generating end portion 313D of the dynamic pressure generating groove 313 are arranged on both sides of the circumferential direction with an imaginary line a, extending in the radial direction through a bent portion formed by the side wall portion **314*d* and the side wall portion 314*d*'**, interposed therebetween.

Accordingly, since the atmosphere A flowing through the inclined groove 314 is guided in the inner radial direction by the side wall portion **314*d*' during the forward rotation of the rotating seal ring 20, the sealed fluid F between the sliding surfaces can be efficiently pushed out toward the inner space S1 by the atmosphere A discharged from the pressure generating end portion 313C into a space between the sliding surfaces as indicated by the arrow L10**.

Fifth Embodiment

Figure 14:
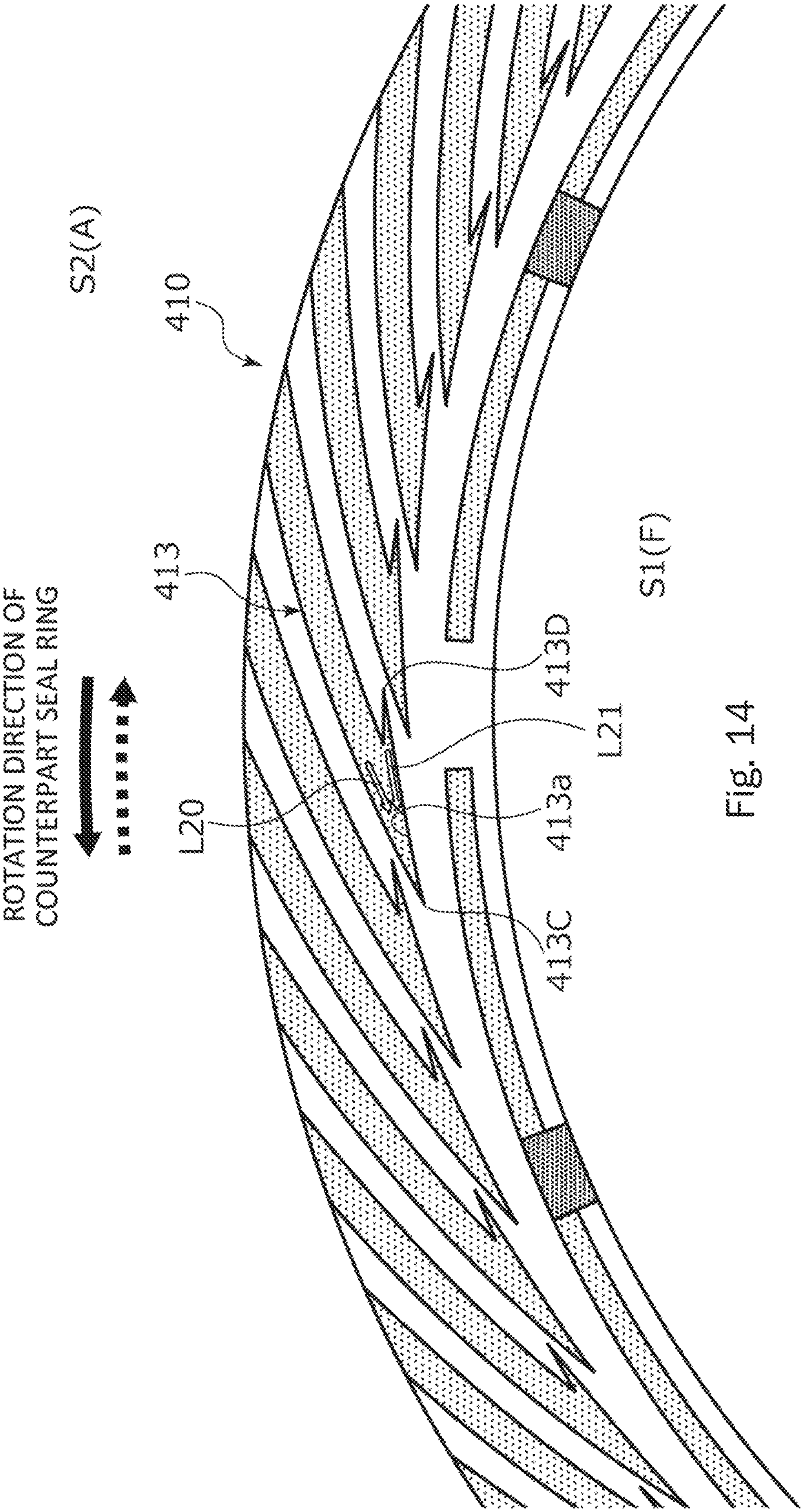
FIG. 14 is an enlarged view of a sliding surface of a stationary seal ring as a sliding component according to a fifth embodiment of the present invention when viewed from the axial direction.

Next, a sliding component according to a fifth embodiment of the present invention will be described with reference to FIG. 14. Furthermore, description of the same configuration and overlapping configuration as in the first embodiment described above will be omitted.

In a stationary seal ring 410 which is a sliding component in the fifth embodiment, a dynamic pressure generating groove 413 has a shape different from that of the dynamic pressure generating groove 13 of the first embodiment and the other configurations are the same as those of the first embodiment.

In the dynamic pressure generating groove 413, a pressure generating end portion 413C is disposed on the side of the inner space S1 in relation to a back pressure generating end portion 413D. An arc-shaped wall portion **413*a* extends in an arc-shaped shape from the back pressure generating end portion 413D relatively located on the side of the outer space S2 toward the pressure generating end portion 413C relatively located on the side of the inner space S1 while being inclined in the forward rotation direction of the rotating seal ring 20**.

Accordingly, since a flow L20 of a fluid flowing from the outer radial side of the dynamic pressure generating groove 413 toward the inner radial side thereof and a flow L21 of a fluid flowing from the back pressure generating end portion 413D toward the pressure generating end portion 413C do not interfere with each other, that is, the flows L20 and L21 are moved in the same direction during the forward rotation of the rotating seal ring 20, a positive pressure can be stably generated at the pressure generating end portion 413C.

Sixth Embodiment

Figure 15:
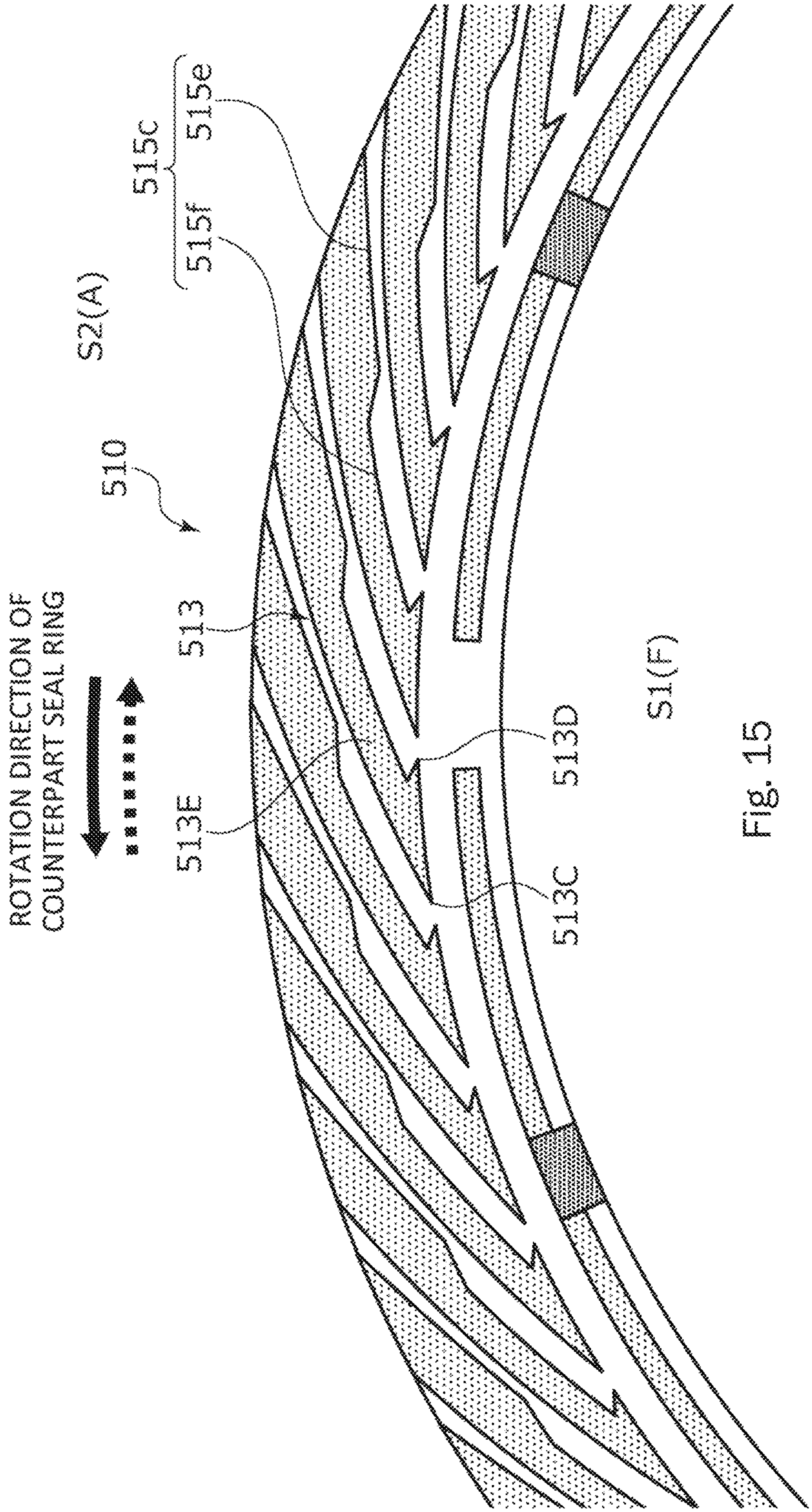
FIG. 15 is a schematic view of a sliding surface of a stationary seal ring as a sliding component according to a sixth embodiment of the present invention when viewed from the axial direction.

Next, a sliding component according to a sixth embodiment of the present invention will be described with reference to FIG. 15. Furthermore, description of the same configuration and overlapping configuration as in the first embodiment described above will be omitted.

In a stationary seal ring 510 which is a sliding component in the sixth embodiment, a dynamic pressure generating groove 513 has a shape different from that of the dynamic pressure generating groove 13 of the first embodiment and the other configurations are the same as those of the first embodiment.

In the dynamic pressure generating groove 513, a narrow portion 513E is provided at a position on the outer radial side in relation to a pressure generating end portion 513C and a back pressure generating end portion 513D. Specifically, an inner radial portion **515*f* of a side wall portion 515*c* of the dynamic pressure generating groove 513 is formed in a step shape to be disposed in the forward rotation direction in relation to an outer radial portion 515*e***.

Accordingly, since the narrow portion 513E is provided in the dynamic pressure generating groove 513, the atmosphere A can be efficiently collected to the pressure generating end portion 513C compared to the dynamic pressure generating groove having a constant width in the extending direction and a positive pressure is easily generated by the atmosphere A at the pressure generating end portion 513C during the forward rotation of the rotating seal ring 20.

Further, the back pressure generating end portion 513D can generate a positive pressure to separate the sliding surfaces from each other during the backward rotation of the rotating seal ring 20.

Figure 16:
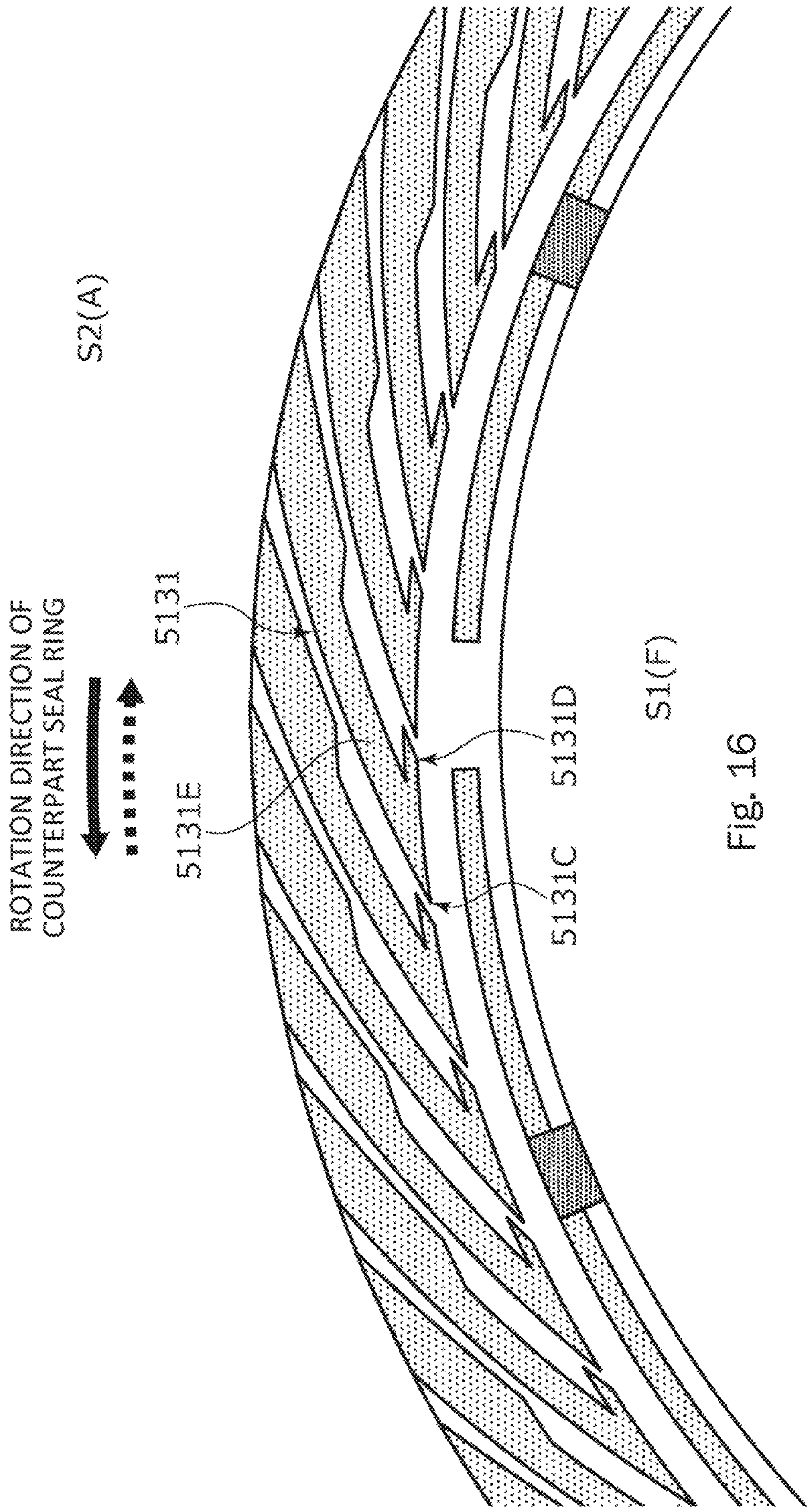
FIG. 16 is a schematic view illustrating Modified Example 6-1 in the sixth embodiment of the present invention.

Furthermore, as Modified Example 6-1 of the dynamic pressure generating groove 513 in the sixth embodiment, as illustrated in FIG. 16, a dynamic pressure generating groove 5131 is provided with a narrow portion 5131E. Further, a back pressure generating end portion 5131D of the dynamic pressure generating groove 5131 has a substantially rectangular shape when viewed from the axial direction.

Accordingly, in the dynamic pressure generating groove 5131, the narrow portion 5131E easily generates a positive pressure by the atmosphere A at the pressure generating end portion 5131C during the forward rotation of the rotating seal ring 20. Further, the back pressure generating end portion 5131D can generate a positive pressure to separate the sliding surfaces from each other during the backward rotation of the rotating seal ring 20.

Figure 17:
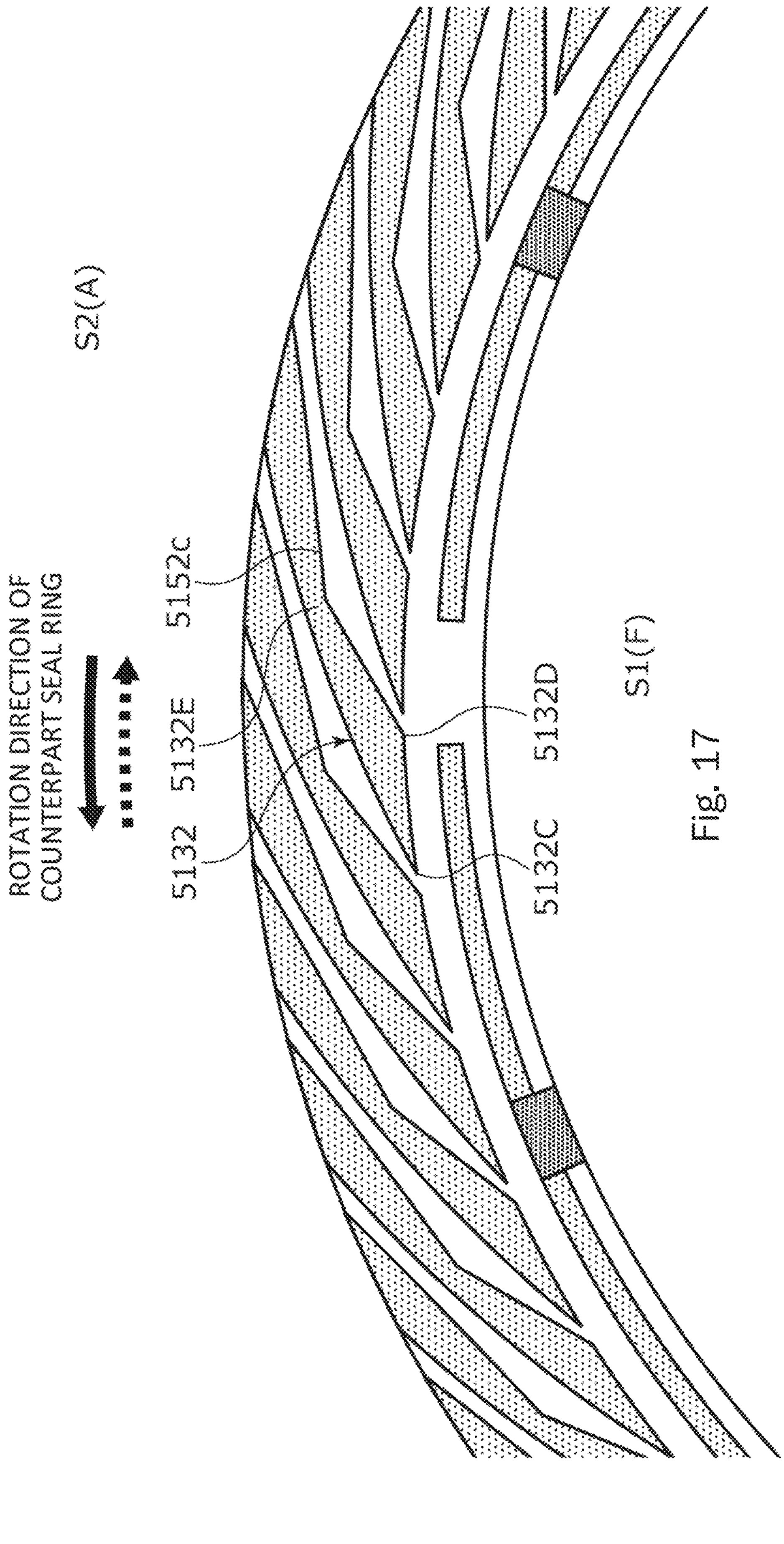
FIG. 17 is a schematic view illustrating Modified Example 6-2 in the sixth embodiment of the present invention.

Further, as Modified Example 6-2 of the dynamic pressure generating groove 513 in the sixth embodiment, as illustrated in FIG. 17, a dynamic pressure generating groove 5132 is provided with a narrow portion 5132E. Specifically, a radially center portion of a side wall portion 5152*c* of the dynamic pressure generating groove 5132 is formed into a substantially mountain shape when viewed from the axial direction that is convex in the forward rotation direction.

Accordingly, in the dynamic pressure generating groove 5132, the narrow portion 5132E easily generates a positive pressure by the atmosphere A at the pressure generating end portion 5132C during the forward rotation of the rotating seal ring 20. Further, the back pressure generating end portion 5132D can generate a positive pressure to separate the sliding surfaces from each other during the backward rotation of the rotating seal ring 20.

Figure 18:
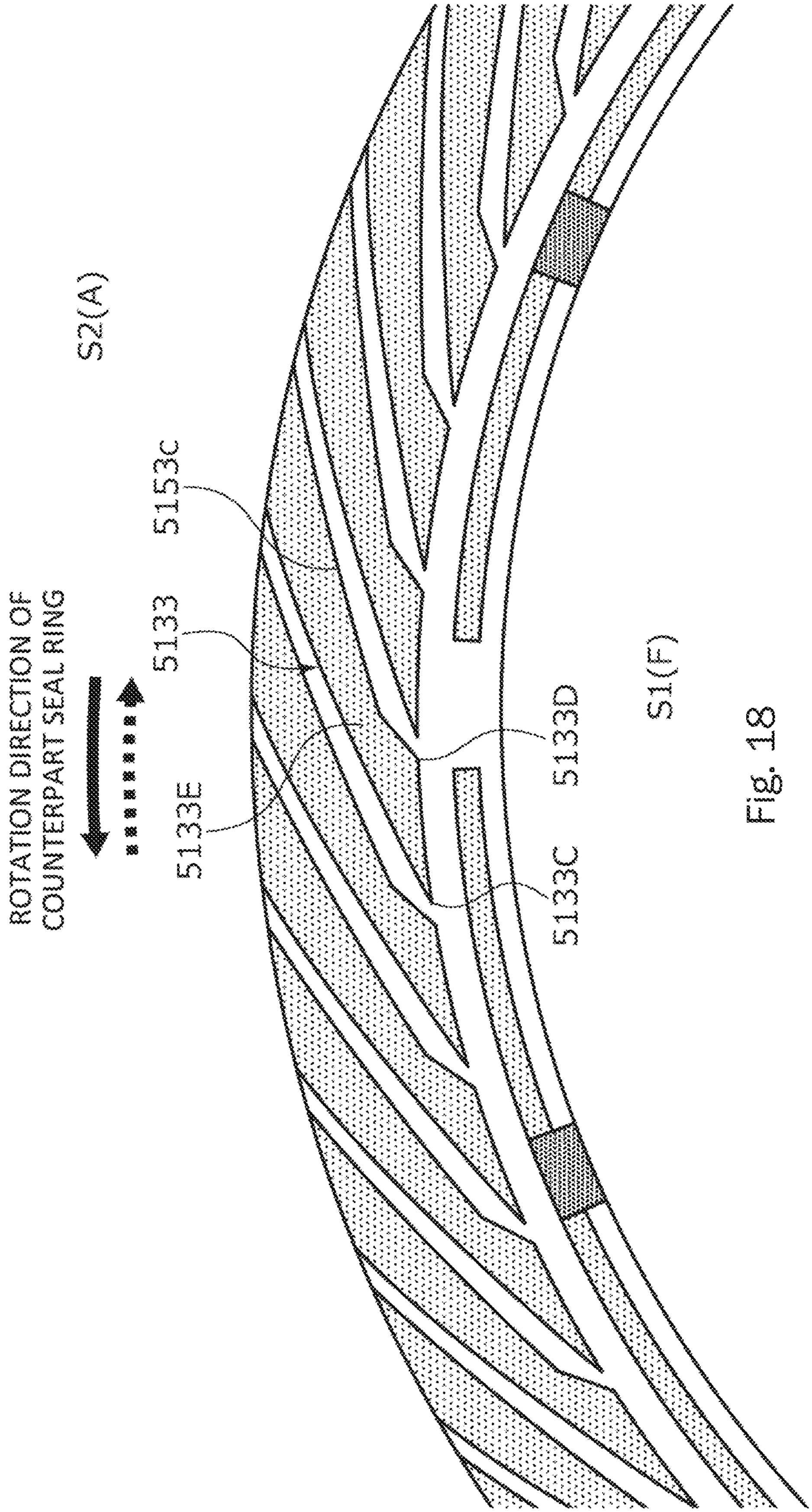
FIG. 18 is a schematic view illustrating Modified Example 6-3 in the sixth embodiment of the present invention.

Further, as Modified Example 6-3 of the dynamic pressure generating groove 513 in the sixth embodiment, as illustrated in FIG. 18, a dynamic pressure generating groove 5133 is provided with a narrow portion 5133E. Specifically, an inner radial portion of the side wall portion 5153*c* of the dynamic pressure generating groove 5133 is formed into a substantially mountain shape when viewed from the axial direction that is convex in the forward rotation direction.

Accordingly, in the dynamic pressure generating groove 5133, the narrow portion 5133E easily generates a positive pressure by the atmosphere A at the pressure generating end portion 5133C during the forward rotation of the rotating seal ring 20. Further, the back pressure generating end portion 5133D can generate a positive pressure to separate the sliding surfaces from each other during the backward rotation of the rotating seal ring 20.

Seventh Embodiment

Figure 19:
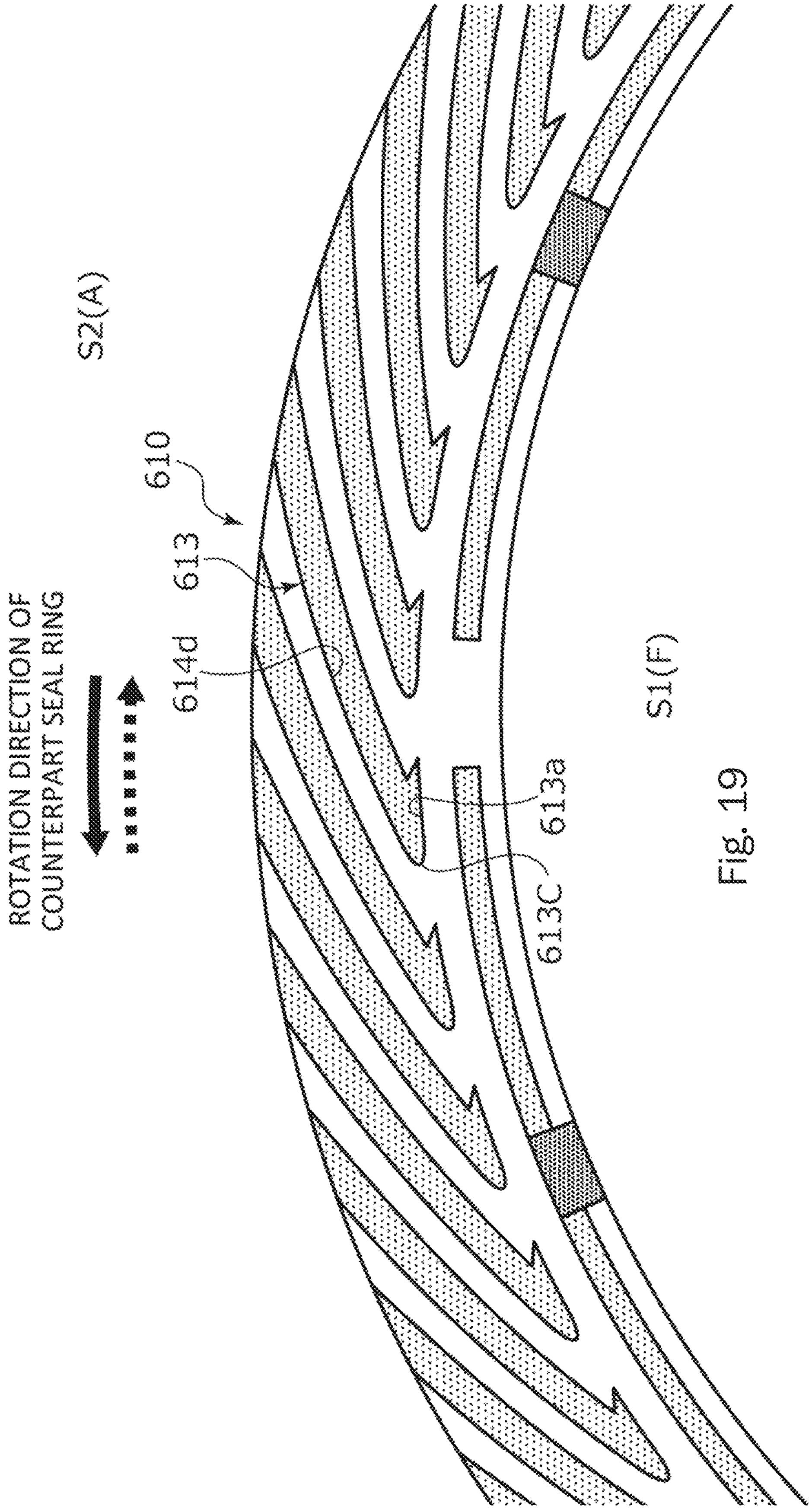
FIG. 19 is a schematic view of a sliding surface of a stationary seal ring as a sliding component according to a seventh embodiment of the present invention when viewed from the axial direction.

Next, a sliding component according to a seventh embodiment of the present invention will be described with reference to FIG. 19. Furthermore, description of the same configuration and overlapping configuration as in the first embodiment described above will be omitted.

In a stationary seal ring 610 which is a sliding component in the seventh embodiment, a dynamic pressure generating groove 613 has a shape different from that of the dynamic pressure generating groove 13 of the first embodiment and the other configurations are the same as those of the first embodiment.

The dynamic pressure generating groove 613 has a bent portion between a side wall portion 614*d* and an inner radial wall portion 613*a*, that is, a pressure generating end portion 613C which is formed in an arc shape to be convex in the forward rotation direction when viewed from the axial direction.

Eighth Embodiment

Figure 20:
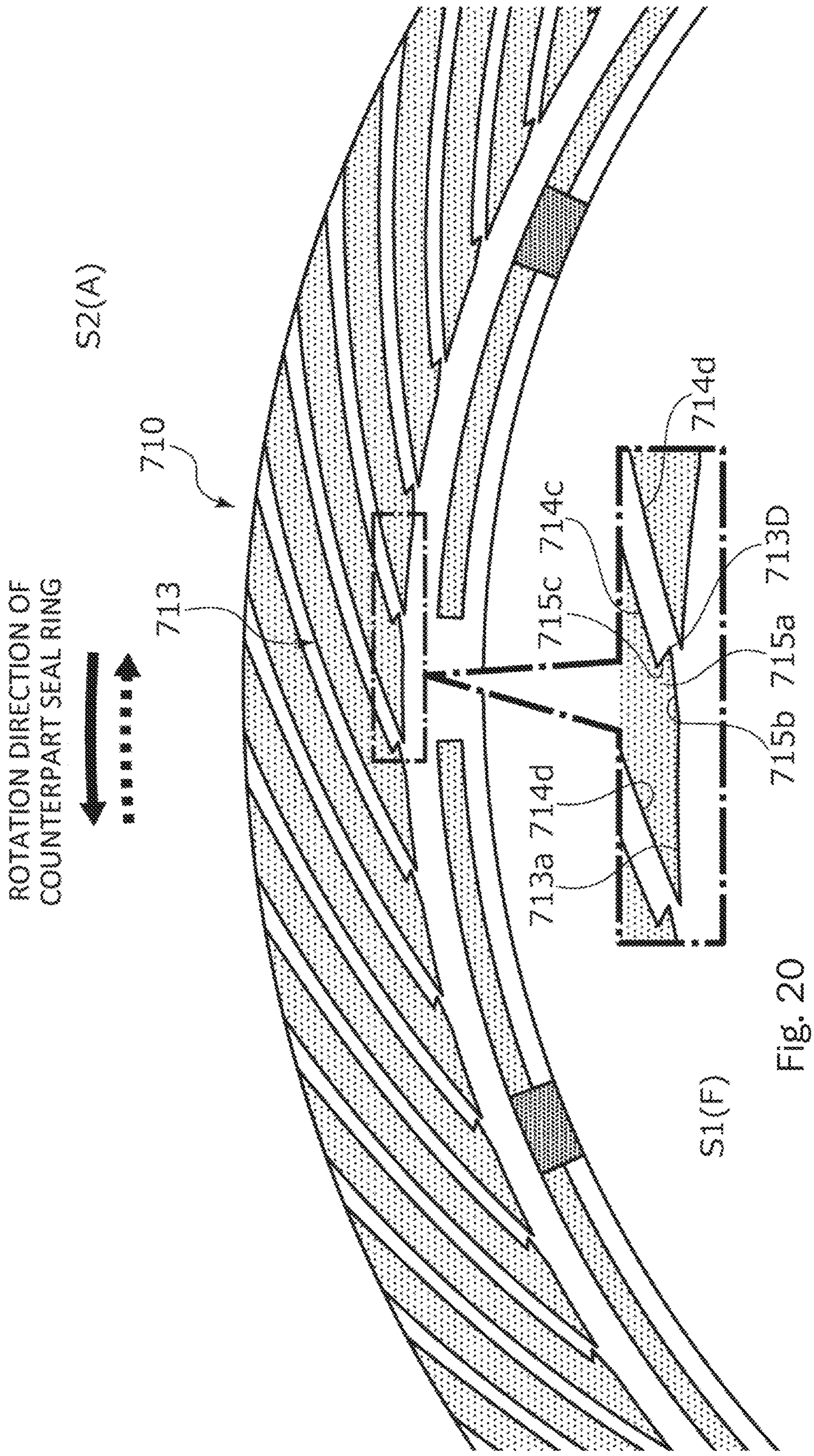
FIG. 20 is a schematic view of a sliding surface of a stationary seal ring as a sliding component according to an eighth embodiment of the present invention when viewed from the axial direction.

Next, a sliding component according to an eighth embodiment of the present invention will be described with reference to FIG. 20. Furthermore, description of the same configuration and overlapping configuration as in the first embodiment described above will be omitted.

In a stationary seal ring 710 which is a sliding component in the eighth embodiment, a dynamic pressure generating groove 713 has a shape different from that of the dynamic pressure generating groove 13 of the first embodiment and the other configurations are the same as those of the first embodiment.

A back pressure generating end portion 713D of the dynamic pressure generating groove 713 is formed by a side wall portion 715*c* which extends from the inner radial side of a side wall portion 714*c* on the backward rotation direction side toward the inner space S1 in the backward rotation direction, a wall portion 715*b* which extends from an end portion of an inner radial wall portion 713*a* in the backward rotation direction toward the outer space S2 in the backward rotation direction, and a bottom surface 715*a*.

Accordingly, since the wall portion 715*b* and the side wall portion 714*d* can be inclined in substantially the same direction, the circumferentially adjacent dynamic pressure generating grooves 713 can be efficiently arranged close to each other in the circumferential direction.

Ninth Embodiment

Figure 21:
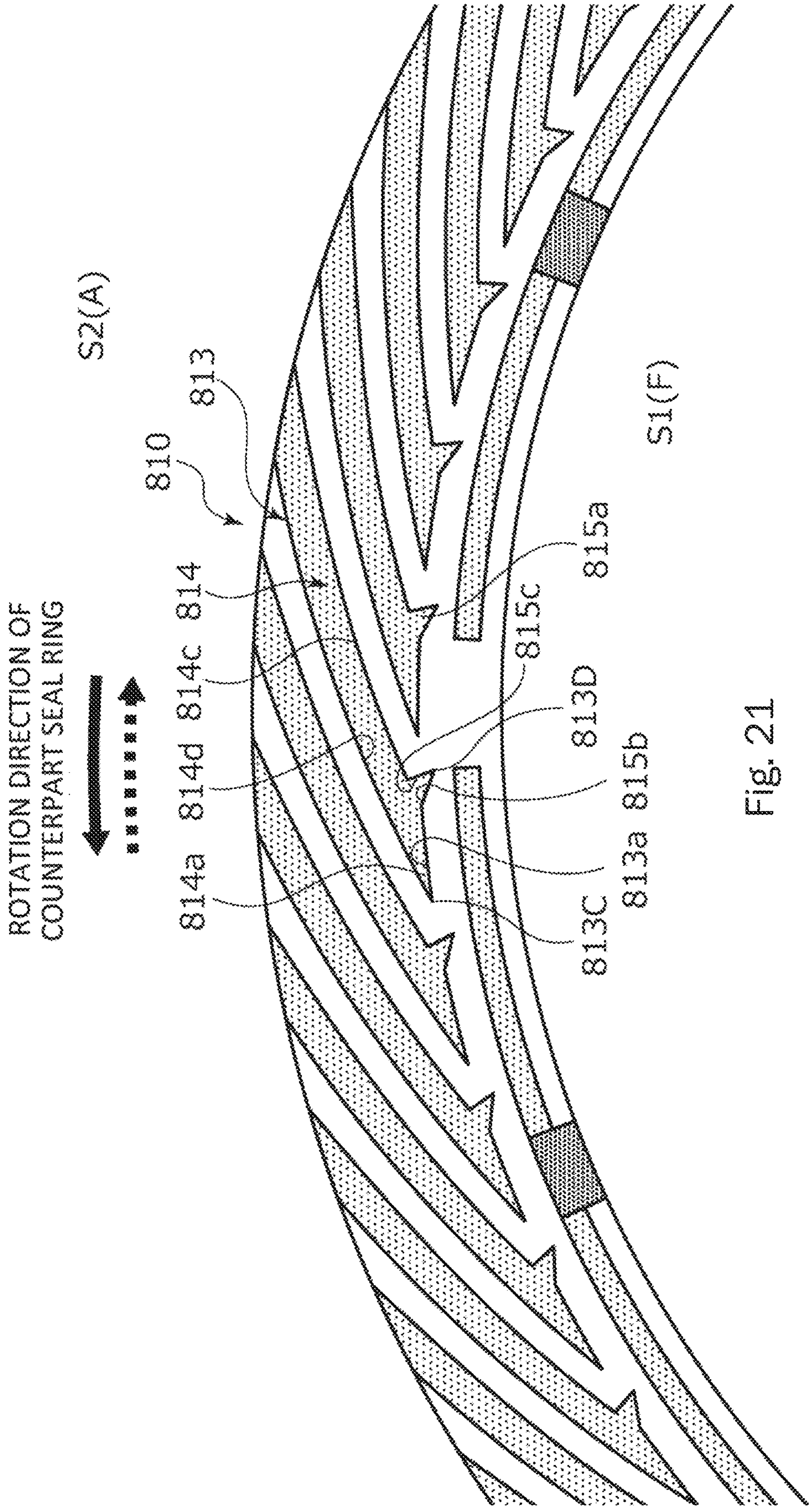
FIG. 21 is a schematic view of a sliding surface of a stationary seal ring as a sliding component according to a ninth embodiment of the present invention when viewed from the axial direction.

Next, a sliding component according to a ninth embodiment of the present invention will be described with reference to FIG. 21. Furthermore, description of the same configuration and overlapping configuration as in the first embodiment described above will be omitted.

In a stationary seal ring 810 which is a sliding component in the ninth embodiment, a dynamic pressure generating groove 813 has a shape different from that of the dynamic pressure generating groove 13 of the first embodiment and the other configurations are the same as those of the first embodiment.

A pressure generating end portion 813C of the dynamic pressure generating groove 813 is formed by a side wall portion 814*d* on the forward rotation direction side, an inner radial wall portion 813*a*, and a bottom surface 814*a*. The inner radial wall portion 813*a* extends in a substantially linear shape in the circumferential direction.

A back pressure generating end portion 813D of the dynamic pressure generating groove 813 is formed by a side wall portion 815*c* which extends from the inner radial side of a side wall portion 814*c* on the backward rotation direction side toward the inner space S1 in the backward rotation direction, a wall portion 815*b* which extends from an end portion of the inner radial wall portion 813*a* in the backward rotation direction toward the inner space S1 in the backward rotation direction, and a bottom surface 815*a*.

That is, the back pressure generating end portion 813D is disposed on the side of the inner space S1 in relation to the pressure generating end portion 813C. Further, the back pressure generating end portion 813D faces the backward rotation direction and the inner radial direction.

The pressure generating end portion 813C and the back pressure generating end portion 813D are not continuous on the surface of one inner space S1 side. In other words, a bent portion is formed between the inner radial wall portion 813*a* and the wall portion 815*b*.

Accordingly, since the sealed fluid F sucked from the back pressure generating end portion 813D moves along the wall portion 815*b* and then moves along the inner radial wall portion 813*a* during the forward rotation of the rotating seal ring 20, the sealed fluid is easily discharged into a space between the sliding surfaces by the flow of the atmosphere A without interfering with the flow of the atmosphere A flowing through the inclined groove 814.

Further, since the back pressure generating end portion 813D faces the backward rotation direction and the inner radial direction, the sealed fluid F can be easily pushed out to the inner radial side to separate the sliding surfaces from each other during the backward rotation of the rotating seal ring 20.

Tenth Embodiment

Figure 22:
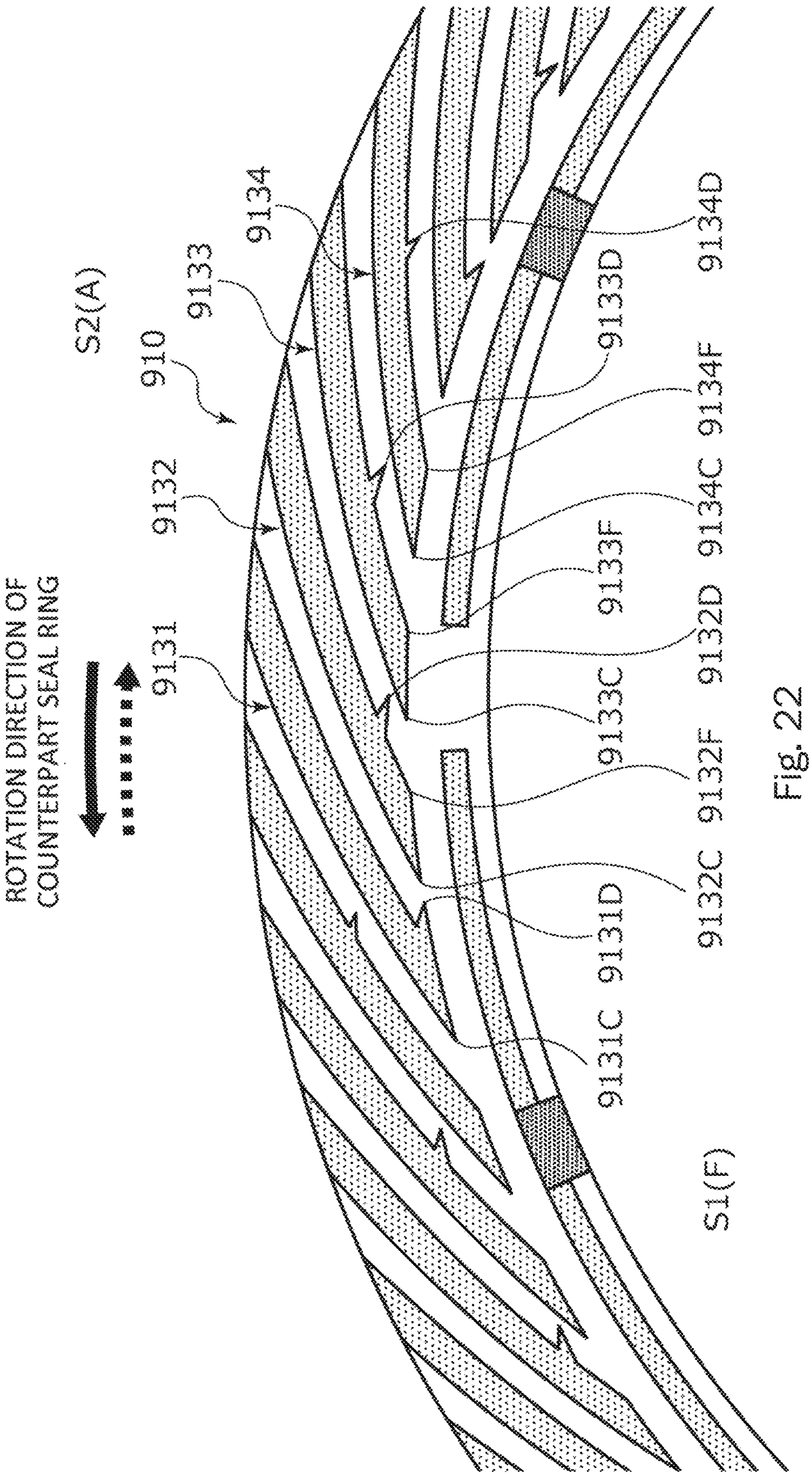
FIG. 22 is a schematic view of a sliding surface of a stationary seal ring as a sliding component according to a tenth embodiment of the present invention when viewed from the axial direction.

Next, a sliding component according to a tenth embodiment of the present invention will be described with reference to FIG. 22. Furthermore, description of the same configuration and overlapping configuration as in the first embodiment described above will be omitted.

In a stationary seal ring 910 which is a sliding component in the tenth embodiment, a plurality of sets of dynamic pressure generating grooves 9131 to 9134 are provided in the circumferential direction. The dynamic pressure generating grooves 9131 to 9134 have the same extending distance.

The dynamic pressure generating groove 9131 has substantially the same configuration as that of the dynamic pressure generating groove 13 of the first embodiment.

The dynamic pressure generating groove 9132 is disposed adjacent to the dynamic pressure generating groove 9131 in the backward rotation direction. The pressure generating end portion 9132C is disposed on the same circumference as the pressure generating end portion 9131C of the dynamic pressure generating groove 9131. The back pressure generating end portion 9132D is disposed on the outer radial side in relation to the back pressure generating end portion 9131D of the dynamic pressure generating groove 9131.

The dynamic pressure generating groove 9133 is disposed adjacent to the dynamic pressure generating groove 9132 in the backward rotation direction. The pressure generating end portion 9133C is disposed on the same circumference as the pressure generating end portion 9131C of the dynamic pressure generating groove 9131. The back pressure generating end portion 9133D is disposed on the outer radial side in relation to the back pressure generating end portion 9132D of the dynamic pressure generating groove 9132.

The dynamic pressure generating groove 9134 is disposed adjacent to the dynamic pressure generating groove 9133 in the backward rotation direction. The pressure generating end portion 9134C is disposed on the same circumference as the pressure generating end portion 9131C of the dynamic pressure generating groove 9131. The back pressure generating end portion 9134D is disposed on the outer radial side in relation to the back pressure generating end portion 9133D of the dynamic pressure generating groove 9133.

That is, the back pressure generating end portions 9131D to 9134D are offset from each other in the radial direction.

Furthermore, corners 9132F to 9134F are respectively formed on the backward rotation direction side of the inner radial ends of the dynamic pressure generating grooves 9132 to 9134 and these corners 9132F to 9134F also can generate a slight amount of back pressure.

Eleventh Embodiment

Figure 23:
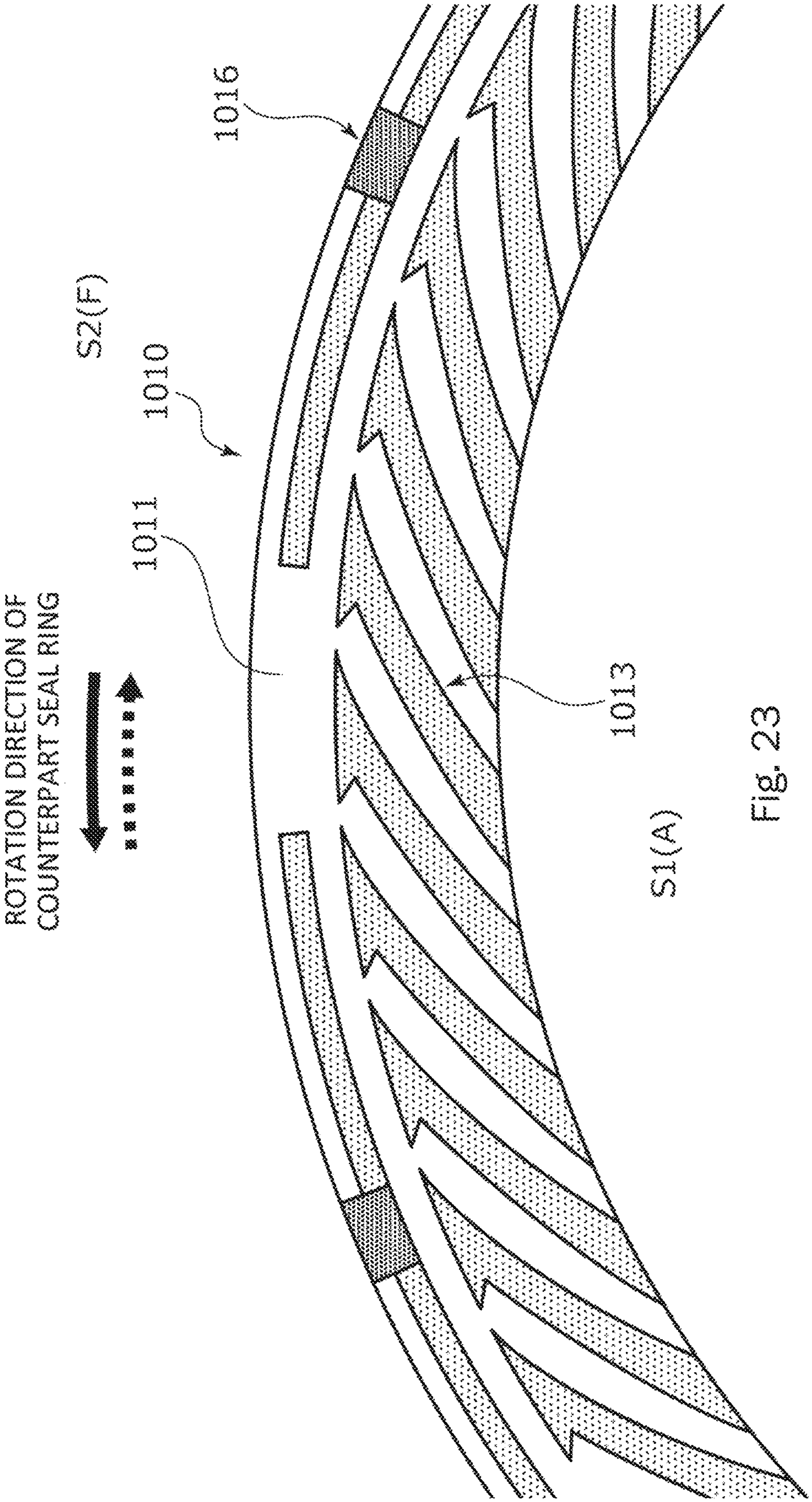
FIG. 23 is an enlarged view of a sliding surface of a stationary seal ring as a sliding component according to an eleventh embodiment of the present invention when viewed from the axial direction.

Next, a sliding component according to an eleventh embodiment of the present invention will be described with reference to FIG. 23. Furthermore, description of the same configuration and overlapping configuration as in the first embodiment described above will be omitted.

A mechanical seal in the eleventh embodiment is of an inside type in which the sealed fluid F that tends to leak from the outer space S2 toward the inner space S1 is sealed and the inner space S1 communicates with the atmosphere A.

In a stationary seal ring 1010 which is a sliding component in the eleventh embodiment, a plurality of dynamic pressure generating grooves 1013 and fluid introduction grooves 1016 are provided in a sliding surface 1011 in the circumferential direction. Furthermore, since the dynamic pressure generating groove 1013 and the fluid introduction groove 1016 have a configuration in which the dynamic pressure generating groove 13 and the fluid introduction groove 16 in the first embodiment are reversed in the radial direction, a detailed description thereof will be omitted.

As described above, the sliding component of the present invention has been described by illustrating the first to eleventh embodiments, Modified Examples 3-1 to 3-5, and Modified Examples 6-1 to 6-3. However, as illustrated in FIGS. 24A and 24B, those in which the dynamic pressure generating groove is a simple inclined groove, that is, the back pressure generating end portion extending from the opposite direction side to the inclined groove in the backward rotation direction is not provided do not correspond to the sliding component of the present invention.

Figure 24:
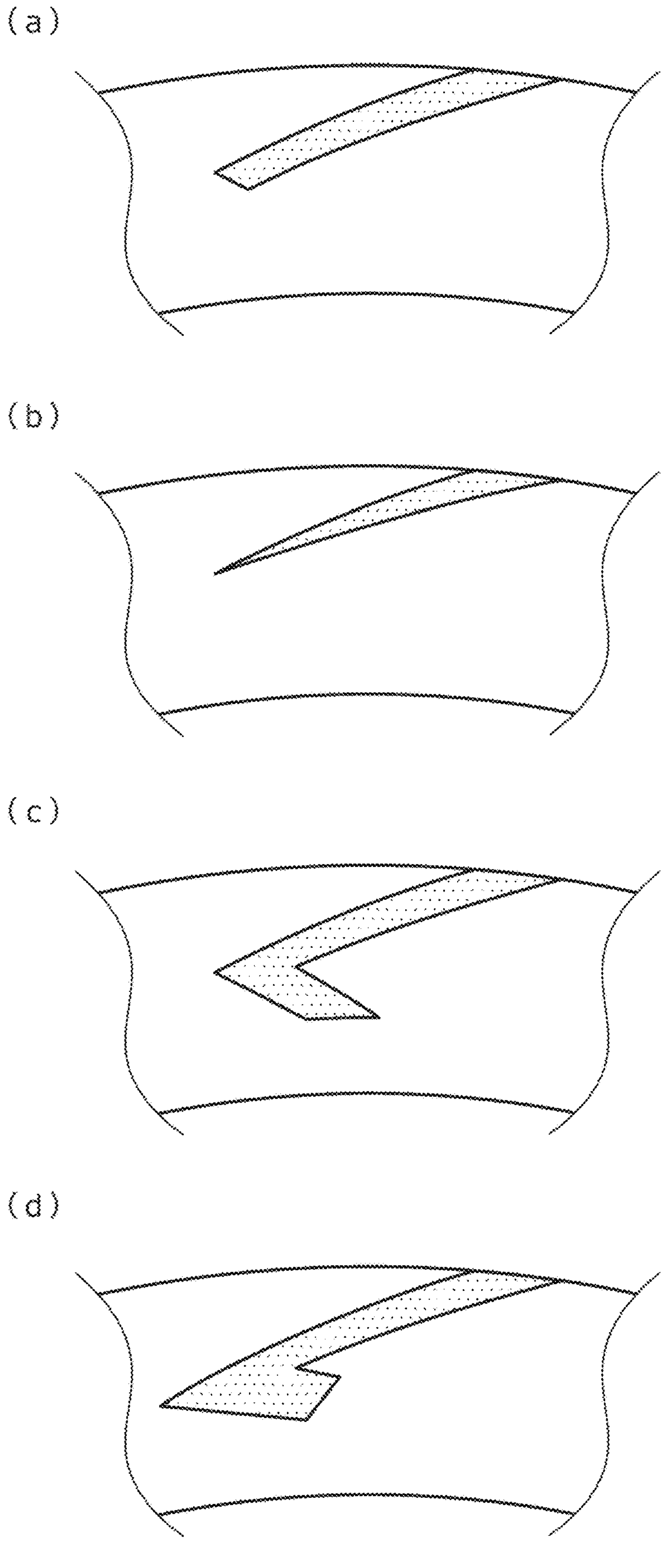
FIGS. 24(*a*), 24(*b*), 24(*c*) and 24(*d*) are explanatory diagrams illustrating examples of a sliding component not corresponding to a sliding component of the present invention.

Further, as illustrated in FIGS. 24C and 24D, those in which the wall portion on the forward rotation direction side constituting the back pressure generating end portion serves as the wall portion of the positive pressure generating end portion, that is, the back pressure generating end portion extends from the forward rotation direction side of the inclined groove in the backward rotation direction in the dynamic pressure generating groove in which a part or all of the back pressure generating end portion having a substantially rectangular shape when viewed from the axial direction is disposed in a space on the sealed fluid side in relation to the positive pressure generating end portion do not correspond to the sliding component of the present invention. In such a dynamic pressure generating groove, since the flow of the fluid in the reverse groove is not sufficiently discharged to the sealed fluid side by the fluid in the inclined groove during forward rotation, the sealing performance is not sufficient compared to the present invention.

Although the embodiments of the present invention have been described above with reference to the drawings, the specific configuration is not limited to these examples, and any changes or additions that do not depart from the scope of the present invention are included in the present invention.

For example, in the first to eleventh embodiments described above, although mechanical seals for automobiles have been described as examples of sliding components, other mechanical seals such as those for general industrial machinery may also be used. Further, the present invention is not limited to the mechanical seal and a sliding component other than the mechanical seal, such as a sliding bearing may be used.

Further, in the first to eleventh embodiments described above, although it has been described that the dynamic pressure generating groove and the fluid introduction groove are provided in the stationary seal ring, the dynamic pressure generating groove and the fluid introduction groove may be provided in the rotating seal ring.

Further, in the first to eleventh embodiments described above, although it has been described that the sealed fluid side is a high pressure side and the leakage side is a low pressure side, the sealed fluid side may be a low pressure side and the leakage side may be a high pressure side.

Further, the sealed fluid side and the leakage side may have substantially the same pressure.

Further, in the first to eleventh embodiments described above, although it has been described that the inclined groove of the dynamic pressure generating groove communicates with the leakage space, the present invention is not limited thereto and the dynamic pressure generating groove may not communicate with the leakage space as long as the dynamic pressure can be generated.

Further, in the first to eighth embodiments, the tenth to eleventh embodiments described above, although it has been described that the pressure generating end portion and the back pressure generating end portion are continuous to each other by the arc-shaped wall portion having an arc shape, the present invention is not limited thereto and the pressure generating end portion and the back pressure generating end portion may be continuous to each other by a flat surface having a linear shape when viewed from the axial direction. Further, a surface continuous to the pressure generating end portion and the back pressure generating end portion may be provided with a step or bent portion in the circumferential direction as in the ninth embodiment, but is preferably not provided with the step or bent portion.

Further, in the first to eleventh embodiments described above, although it has been described that all dynamic pressure generating grooves are provided with the reverse groove, the dynamic pressure generating groove with the reverse groove and the dynamic pressure generating groove without the reverse groove may be provided together. Since the dynamic pressure generating groove with the reverse groove can collect the sealed fluid between the sliding surfaces and return the sealed fluid to a space between the sliding surfaces, the dynamic pressure generating groove is preferably disposed near the end portion of the Rayleigh step.

Further, in the first to eleventh embodiments described above, although it has been described that the fluid introduction groove communicates with the sealed fluid space, the present invention is not limited thereto. For example, the fluid introduction groove may not communicate with the sealed fluid space if the sealed fluid can be stored and may be a dimple or the like.

Further, in the first to eleventh embodiments described above, although it has been described that the fluid introduction groove has the Rayleigh step, the present invention is not limited thereto. For example, if the dynamic pressure can be generated, the dynamic pressure generating portion may be an inclined groove which extends in the radial direction to be inclined in the circumferential direction.

Furthermore, the configuration of the dynamic pressure generating portion may be omitted.

Further, in the first to eleventh embodiments described above, although it has been described that the plurality of fluid introduction grooves are provided in the circumferential direction, at least one fluid introduction groove may be provided. Furthermore, the configuration of the fluid introduction groove may be omitted.

Further, in the first to eleventh embodiments described above, although it has been described that the sealed fluid F is a high-pressure liquid, the present invention is not limited thereto and the sealed fluid may be a gas or low-pressure liquid or a mist mixture of a liquid and a gas.

Further, in the first to eleventh embodiments described above, although it has been described that the leakage side fluid is the atmosphere A which is a low-pressure gas, the present invention is not limited thereto and the leakage side fluid may be a liquid or high-pressure gas or a mist mixture of a liquid and a gas.

REFERENCE SIGNS LIST

10 Stationary seal ring (sliding component)
11 Sliding surface
13 Dynamic pressure generating groove
13C Pressure generating end portion (first dynamic pressure generating end portion)
13D Back pressure generating end portion (second dynamic pressure generating end portion)
13*a* Arc-shaped wall portion (arc-shaped surface)
14 Inclined groove
14*a* Bottom surface
14*b* Wall portion
14*c* Side wall portion
14*d* Side wall portion
15 Reverse groove
15*a* Bottom surface
15*b* Wall portion
15*c* Side wall portion
16 Fluid introduction groove (fluid input/output groove)
17 Fluid guide groove portion
18, 18' Rayleigh step (dynamic pressure generating portion)
20 Rotating seal ring (counterpart sliding component)
21 Sliding surface
A Atmosphere
F Sealed fluid
S1 Inner space (sealed fluid space)
S2 Outer space (leakage space)

The invention claimed is:

1. A sliding component which is one of two sliding rings that rotate relative to each other and partition a sealed fluid space and a leakage space, wherein the sliding component includes a plurality of dynamic pressure generating grooves each configured to generate a dynamic pressure, the dynamic pressure generating groove includes a plurality of inclined grooves and a plurality of reverse grooves, each of the inclined grooves extends from the leakage space toward the sealed fluid space with an inclination in a forward rotation direction which is a relative rotation direction of a remaining one of the two sliding rings, and has a first dynamic pressure generating end portion, each of the reverse grooves extends from a backward rotation direction side of each of the inclined grooves in a backward rotation direction which is a relative rotation direction of the remaining one of the two sliding rings, and has a second dynamic pressure generating end portion, and sealed-fluid-space-side wall portions of the inclined grooves on a side of the sealed fluid space extend on a circumferential line.

2. The sliding component according to claim 1, wherein the second dynamic pressure generating end portion extends from a closed end portion of the inclined groove, and the first dynamic pressure generating end portion and the second dynamic pressure generating end portion are aligned in a circumferential line.

3. The sliding component according to claim 2, wherein wall surfaces of the first dynamic pressure generating end portion and the second dynamic pressure generating end portion on a side of the sealed fluid space are continuous to collectively form a smoothly continuous surface.

4. The sliding component according to claim 1, wherein the first dynamic pressure generating end portion is disposed on a side of the leakage space in relation to the second dynamic pressure generating end portion.

5. The sliding component according to claim 4, wherein wall surfaces of the first dynamic pressure generating end portion and the second dynamic pressure generating end portion on a side of the sealed fluid space are continuous to collectively form a smoothly continuous surface.

6. The sliding component according to claim 1, wherein wall surfaces of the first dynamic pressure generating end portion and the second dynamic pressure generating end portion on a side of the sealed fluid space are continuous to collectively form a smoothly continuous surface.

7. The sliding component according to claim 1, wherein wall surfaces of the first dynamic pressure generating end portion and the second dynamic pressure generating end portion on a side of the sealed fluid space are continuous to collectively form an arc-shaped surface.

8. The sliding component according to claim 1, wherein the first dynamic pressure generating end portion is defined by lines crossing each other at an acute angle when viewed from an axial direction.

9. The sliding component according to claim 1, wherein the first dynamic pressure generating end portion is tapered in the forward rotation direction and has a curved tip.

10. The sliding component according to claim 1, wherein the second dynamic pressure generating end portion is defined by lines crossing each other at an acute angle when viewed from an axial direction.

11. The sliding component according to claim 1, wherein the second dynamic pressure generating end portion is tapered in the backward rotation direction and has a curved tip.

12. The sliding component according to claim 1, further comprising:

a fluid input/output groove which communicates with the sealed fluid space.

13. The sliding component according to claim 12, wherein the fluid input/output groove includes a dynamic pressure generating portion.

14. A sliding component which is one of two sliding rings that rotate relative to each other and partition a sealed fluid space and a leakage space, wherein the sliding component includes a plurality of dynamic pressure generating grooves each configured to generate a dynamic pressure, the dynamic pressure generating groove includes a plurality of inclined grooves and a plurality of reverse grooves, each of the inclined grooves extends from the leakage space toward the sealed fluid space with an inclination in a forward rotation direction which is a relative rotation direction of a remaining one of the two sliding rings, and has a first dynamic pressure generating end portion, each of the reverse grooves extends from a backward rotation direction side of each of the inclined grooves in a backward rotation direction which is a relative rotation direction of the remaining one of the two sliding rings, and has a second dynamic pressure generating end portion, and the first dynamic pressure generating end portion is disposed on a side of the sealed fluid space in relation to the second dynamic pressure generating end portion.

15. The sliding component according to claim 14, wherein wall surfaces of the first dynamic pressure generating end portion and the second dynamic pressure generating end portion on a side of the sealed fluid space are continuous to collectively form a smoothly continuous surface.

* * * * *